(12) United States Patent
Moore et al.

(10) Patent No.: US 7,325,194 B2
(45) Date of Patent: Jan. 29, 2008

(54) METHOD, SYSTEM, AND APPARATUS FOR CONVERTING NUMBERS BETWEEN MEASUREMENT SYSTEMS BASED UPON SEMANTICALLY LABELED STRINGS

(75) Inventors: Thomas G. Moore, Duvall, WA (US); Mohamed A. Abbar, Redmond, WA (US); Athapan Arayasantiparb, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 10/140,544

(22) Filed: May 7, 2002

(65) Prior Publication Data

US 2003/0212527 A1  Nov. 13, 2003

(51) Int. Cl.
*G06N 3/00* (2006.01)
(52) U.S. Cl. ...................................... 715/530; 715/538
(58) Field of Classification Search ................ 715/536, 715/530, 538; 708/206; 705/1; 704/1; 717/137
See application file for complete search history.

(56) References Cited

U.S. PATENT DOCUMENTS

| | | | |
|---|---|---|---|
| 4,674,065 A | 6/1987 | Lange et al. ................ 364/900 |
| 4,868,750 A | 9/1989 | Kucera et al. ................. 711/2 |
| 5,020,019 A | 5/1991 | Ogawa ........................ 364/900 |
| 5,128,865 A | 7/1992 | Sadler ............................ 704/2 |
| 5,159,552 A * | 10/1992 | van Gasteren et al. .......... 704/1 |
| 5,267,155 A | 11/1993 | Buchanan et al. ..... 364/419.14 |
| 5,297,039 A | 3/1994 | Kanaegami et al. ............ 707/5 |
| 5,317,546 A | 5/1994 | Balch et al. .................... 368/9 |
| 5,337,233 A | 8/1994 | Hofert et al. .......... 364/419.14 |
| 5,341,293 A | 8/1994 | Vertelney et al. ............ 715/530 |
| 5,351,190 A | 9/1994 | Kondo .................. 364/419.08 |

(Continued)

FOREIGN PATENT DOCUMENTS

EP  0 364 180 A2  4/1990

(Continued)

OTHER PUBLICATIONS

Writing application for uniform operation on a mainframe or pc: a metric conversion program by chales a. schulz, lockheed missles & space company, inc sunnyvale ca USA Publised May 1990 pp. 1-6.*

(Continued)

*Primary Examiner*—Stephen Hong
*Assistant Examiner*—Manglesh M. Patel
(74) *Attorney, Agent, or Firm*—Merchant & Gould

(57) ABSTRACT

Number conversion between different units of measurement in a document is enabled. A string of text entered into an application program is analyzed to determine whether it includes a number having an associated unit name. Found numbers with associated unit names are semantically labeled with schema information identifying the unit name as a source unit of measurement. When the number is selected or an indication received that the number is labeled with schema information, a list of actions may be provided identifying conversion options for the number. In response to selection of one of the conversion options, the selected number is converted to the destination unit of measure identified by the selected action. The converted number may then be inserted into the string of text to replace the selected number along with a unit name corresponding to the destination unit of measure.

17 Claims, 10 Drawing Sheets

U.S. PATENT DOCUMENTS

| | | |
|---|---|---|
| 5,386,564 A | 1/1995 | Shearer et al. ............... 707/101 |
| 5,392,386 A | 2/1995 | Chalas ....................... 395/155 |
| 5,418,902 A | 5/1995 | West et al. .................. 715/503 |
| 5,446,891 A | 8/1995 | Kaplan et al. ............... 395/600 |
| 5,541,836 A | 7/1996 | Church et al. .................. 704/7 |
| 5,596,700 A | 1/1997 | Darnell et al. ............... 715/512 |
| 5,617,565 A | 4/1997 | Augenbraun et al. ........ 395/604 |
| 5,625,783 A | 4/1997 | Ezekiel et al. ............... 395/352 |
| 5,627,958 A | 5/1997 | Potts et al. .................. 715/708 |
| 5,634,019 A | 5/1997 | Koppolu et al. ............. 715/744 |
| 5,640,560 A | 6/1997 | Smith .......................... 395/615 |
| 5,657,259 A | 8/1997 | Davis et al. ........... 364/715.03 |
| 5,685,000 A | 11/1997 | Cox ............................. 704/9 |
| 5,708,825 A | 1/1998 | Sotomayor .................. 395/762 |
| 5,717,923 A | 2/1998 | Dedrick ....................... 395/613 |
| 5,752,022 A | 5/1998 | Chiu et al. ................... 395/610 |
| 5,761,689 A | 6/1998 | Rayson et al. ............... 707/533 |
| 5,765,156 A | 6/1998 | Guzak et al. ................. 707/100 |
| 5,781,189 A | 7/1998 | Holleran et al. ............. 715/826 |
| 5,781,904 A | 7/1998 | Oren et al. ................... 707/100 |
| 5,794,257 A | 8/1998 | Liu et al. ..................... 707/501 |
| 5,802,253 A | 9/1998 | Gross et al. ................... 395/51 |
| 5,802,262 A | 9/1998 | Van De Vanter ............ 395/180 |
| 5,802,299 A | 9/1998 | Logan et al. ........... 395/200.48 |
| 5,802,530 A | 9/1998 | Van Hoff ..................... 707/513 |
| 5,805,911 A | 9/1998 | Miller .......................... 395/796 |
| 5,809,318 A | 9/1998 | Rivette et al. ............... 715/512 |
| 5,815,830 A | 9/1998 | Anthony ......................... 707/6 |
| 5,818,447 A | 10/1998 | Wolf et al. ................... 715/752 |
| 5,821,931 A | 10/1998 | Berquist et al. ............. 715/784 |
| 5,822,539 A | 10/1998 | van Hoff ............... 395/200.66 |
| 5,826,025 A | 10/1998 | Gramlich ............... 395/200.47 |
| 5,832,100 A | 11/1998 | Lawton et al. ............... 382/100 |
| 5,845,077 A | 12/1998 | Fawcett ........................ 709/221 |
| 5,855,007 A | 12/1998 | Jovicic et al. ................. 705/14 |
| 5,859,636 A | 1/1999 | Pandit .......................... 345/335 |
| 5,872,973 A | 2/1999 | Mitchell et al. ............. 395/685 |
| 5,875,443 A | 2/1999 | Nielsen .......................... 707/2 |
| 5,877,757 A | 3/1999 | Baldwin et al. ............. 715/705 |
| 5,892,919 A | 4/1999 | Nielsen ................. 395/200.58 |
| 5,893,073 A | 4/1999 | Kasso et al. .................... 705/8 |
| 5,895,461 A | 4/1999 | De La Huerga et al. ......... 707/1 |
| 5,896,321 A | 4/1999 | Miller et al. ............ 365/189.01 |
| 5,900,004 A | 5/1999 | Gipson ......................... 707/530 |
| 5,907,852 A | 5/1999 | Yamada ....................... 715/541 |
| 5,913,214 A | 6/1999 | Madnick et al. ............... 707/10 |
| 5,920,859 A | 7/1999 | Li ................................. 707/5 |
| 5,924,099 A | 7/1999 | Guzak et al. ................. 707/100 |
| 5,933,498 A | 8/1999 | Schneck et al. ............... 705/54 |
| 5,944,787 A | 8/1999 | Zoken .......................... 709/206 |
| 5,946,647 A | 8/1999 | Miller et al. .................... 704/9 |
| 5,948,061 A | 9/1999 | Merriman et al. ........... 709/219 |
| 5,956,681 A | 9/1999 | Yamakita ..................... 704/260 |
| 5,974,413 A | 10/1999 | Beauregard et al. ............. 707/6 |
| 5,987,480 A | 11/1999 | Donohue et al. ......... 715/501.1 |
| 5,991,719 A | 11/1999 | Yazaki et al. ................ 704/251 |
| 5,995,756 A | 11/1999 | Herrmann ................... 395/712 |
| 6,006,265 A | 12/1999 | Rangan et al. ............... 709/226 |
| 6,006,279 A | 12/1999 | Hayes .......................... 719/328 |
| 6,014,616 A | 1/2000 | Kim ............................... 704/8 |
| 6,018,761 A | 1/2000 | Uomini ........................ 709/206 |
| 6,028,605 A | 2/2000 | Conrad et al. ............... 345/354 |
| 6,052,531 A | 4/2000 | Waldin et al. ............... 717/170 |
| 6,061,516 A | 5/2000 | Yoshikawa et al. ......... 717/109 |
| 6,067,087 A | 5/2000 | Krauss et al. ................ 715/762 |
| 6,085,201 A | 7/2000 | Tso .............................. 707/505 |
| 6,088,711 A | 7/2000 | Fein et al. .................... 715/523 |
| 6,092,074 A | 7/2000 | Rodkin et al. ............... 707/102 |
| 6,108,674 A | 8/2000 | Murakami et al. ........... 707/515 |
| 6,112,209 A | 8/2000 | Gusack ......................... 707/101 |
| 6,121,968 A | 9/2000 | Arcuri et al. ................. 345/352 |
| 6,122,647 A | 9/2000 | Horowitz et al. ............ 707/513 |
| 6,126,306 A | 10/2000 | Ando ..................... 364/419.02 |
| 6,137,911 A | 10/2000 | Zhilyaev ...................... 382/225 |
| 6,141,005 A | 10/2000 | Hetherington et al. ...... 715/866 |
| 6,151,643 A | 11/2000 | Cheng et al. .................. 710/36 |
| 6,154,738 A | 11/2000 | Call ................................ 707/4 |
| 6,167,568 A | 12/2000 | Gandel et al. ............... 717/176 |
| 6,173,316 B1 | 1/2001 | De Boor et al. ............. 709/218 |
| 6,182,029 B1 | 1/2001 | Friedman ........................ 704/9 |
| 6,185,550 B1 | 2/2001 | Snow et al. ..................... 707/1 |
| 6,185,576 B1 | 2/2001 | McIntosh ..................... 707/200 |
| 6,199,046 B1* | 3/2001 | Heinzle et al. ................. 705/1 |
| 6,199,081 B1 | 3/2001 | Meyerzon et al. ........... 715/513 |
| 6,219,698 B1 | 4/2001 | Iannucci et al. ............. 709/221 |
| 6,262,728 B1 | 7/2001 | Alexander ................ 345/440.1 |
| 6,272,074 B1 | 8/2001 | Winner .......................... 368/10 |
| 6,272,505 B1 | 8/2001 | De La Huerga ............. 707/501 |
| 6,292,768 B1 | 9/2001 | Chan .............................. 704/1 |
| 6,295,061 B1 | 9/2001 | Park et al. .................... 715/764 |
| 6,308,171 B1 | 10/2001 | De La Huerga ............... 707/3 |
| 6,311,177 B1 | 10/2001 | Dauerer et al. ................ 707/2 |
| 6,311,194 B1 | 10/2001 | Sheth et al. .................. 707/505 |
| 6,323,853 B1 | 11/2001 | Hedloy ........................ 345/339 |
| 6,336,125 B2 | 1/2002 | Noda et al. ................... 715/531 |
| 6,336,131 B1 | 1/2002 | Wolfe et al. ................. 709/203 |
| 6,338,059 B1 | 1/2002 | Field et al. ...................... 707/4 |
| 6,347,398 B1 | 2/2002 | Parthasarathy et al. ..... 717/170 |
| 6,349,295 B1 | 2/2002 | Tedesco et al. ................. 707/3 |
| 6,353,926 B1 | 3/2002 | Parthesarathy et al. ....... 717/11 |
| 6,381,742 B2 | 4/2002 | Forbes et al. ................ 717/176 |
| 6,408,323 B1 | 6/2002 | Kobayashi et al. .......... 718/100 |
| 6,424,979 B1 | 7/2002 | Livingston et al. ......... 715/511 |
| 6,434,567 B1 | 8/2002 | De La Huerga ............. 707/102 |
| 6,438,545 B1 | 8/2002 | Beauregard et al. ............. 707/6 |
| 6,477,510 B1 | 11/2002 | Johnson ........................ 705/30 |
| 6,480,860 B1 | 11/2002 | Monday ....................... 707/102 |
| 6,493,006 B1 | 12/2002 | Gourdol et al. .............. 345/825 |
| 6,516,321 B1 | 2/2003 | De La Huerga ............. 707/102 |
| 6,519,557 B1 | 2/2003 | Emens et al. ................... 704/8 |
| 6,519,603 B1 | 2/2003 | Bays et al. ................... 707/102 |
| 6,546,433 B1 | 4/2003 | Matheson .................... 709/318 |
| 6,553,385 B2 | 4/2003 | Johnson et al. .......... 707/104.1 |
| 6,556,984 B1 | 4/2003 | Zien ............................... 707/2 |
| 6,564,264 B1 | 5/2003 | Creswell et al. ............. 709/245 |
| 6,571,241 B1 | 5/2003 | Nosohara ....................... 707/6 |
| 6,618,733 B1 | 9/2003 | White et al. ................. 707/103 |
| 6,622,140 B1 | 9/2003 | Kantrowitz .................... 707/5 |
| 6,623,527 B1 | 9/2003 | Hamzy ......................... 715/513 |
| 6,625,581 B1 | 9/2003 | Perkowski .................... 705/27 |
| 6,629,079 B1 | 9/2003 | Spiegel et al. ................ 705/26 |
| 6,631,519 B1 | 10/2003 | Nicholson et al. .......... 717/169 |
| 6,636,880 B1* | 10/2003 | Bera ............................. 708/206 |
| 6,658,623 B1 | 12/2003 | Schilit et al. ................. 715/513 |
| 6,687,485 B2 | 2/2004 | Hopkins et al. ............. 434/350 |
| 6,694,307 B2 | 2/2004 | Julien ............................. 707/3 |
| 6,697,824 B1 | 2/2004 | Bowman-Amuah ......... 707/229 |
| 6,697,837 B1 | 2/2004 | Rodov .......................... 709/203 |
| 6,708,189 B1 | 3/2004 | Fitzsimons et al. .......... 707/205 |
| 6,715,144 B2 | 3/2004 | Daynes et al. ............... 717/174 |
| 6,717,593 B1 | 4/2004 | Jennings ...................... 715/760 |
| 6,718,516 B1 | 4/2004 | Claussen et al. ............. 715/513 |
| 6,728,679 B1 | 4/2004 | Strubbe et al. ........... 704/270.1 |
| 6,732,090 B2 | 5/2004 | Shanahan et al. .............. 707/3 |
| 6,732,361 B1 | 5/2004 | Andreoli et al. ............. 719/313 |
| 6,745,208 B2 | 6/2004 | Berg et al. ................... 707/201 |
| 6,795,808 B1 | 9/2004 | Strubbe et al. .............. 704/275 |
| 6,802,061 B1 | 10/2004 | Parthasarathy et al. ..... 717/173 |
| 6,826,726 B2 | 11/2004 | Hsing et al. ................. 715/513 |
| 6,868,525 B1 | 3/2005 | Szabo .......................... 715/738 |
| 6,874,143 B1 | 3/2005 | Murray et al. ............... 717/173 |
| 6,880,129 B1 | 4/2005 | Lee et al. ..................... 715/763 |
| 6,883,137 B1 | 4/2005 | Girardot et al. .............. 715/513 |
| 6,925,457 B2 | 8/2005 | Britton et al. .................. 707/1 |

| | | | | | | |
|---|---|---|---|---|---|---|
| 6,925,470 B1 | 8/2005 | Sangudi et al. ............. 707/102 | | 2004/0003389 A1 | 1/2004 | Reynar et al. ............. 717/178 |
| 6,944,857 B1 | 9/2005 | Glaser et al. ............... 717/173 | | 2004/0006741 A1 | 1/2004 | Radja et al. ................ 715/513 |
| 6,948,133 B2 | 9/2005 | Haley ........................ 715/780 | | 2004/0039990 A1 | 2/2004 | Baker et al. ............... 715/505 |
| 6,950,982 B1 | 9/2005 | Dourish ...................... 715/512 | | 2004/0133846 A1 | 7/2004 | Khoshatefeh et al. ........ 715/500 |
| 6,957,385 B2 | 10/2005 | Chan et al. .................. 715/504 | | 2004/0165007 A1 | 8/2004 | Shafron ..................... 345/781 |
| 6,976,090 B2 | 12/2005 | Ben-Shaul et al. ......... 709/246 | | 2004/0199861 A1 | 10/2004 | Lucovsky .................. 715/500 |
| 6,986,104 B2 | 1/2006 | Green et al. ................ 715/523 | | 2004/0201867 A1 | 10/2004 | Katano ..................... 358/1.15 |
| 7,013,289 B2 | 3/2006 | Horn et al. ................... 705/26 | | 2004/0236717 A1 | 11/2004 | Demartini et al. ............. 707/1 |
| 7,051,076 B2 | 5/2006 | Tsuchiya .................... 709/206 | | 2005/0050164 A1 | 3/2005 | Burd et al. ................ 709/217 |
| 7,082,392 B1 | 7/2006 | Butler et al. ................ 704/233 | | 2005/0055330 A1 | 3/2005 | Britton et al. ................ 707/1 |
| 7,113,976 B2 | 9/2006 | Watanabe .................... 709/206 | | 2005/0094830 A1 | 5/2005 | Nakao ....................... 382/103 |
| 2001/0029605 A1 | 10/2001 | Forbes et al. ................ 717/11 | | 2005/0120313 A1 | 6/2005 | Rudd et al. ................ 715/866 |
| 2001/0041328 A1 | 11/2001 | Fisher ........................ 434/157 | | 2005/0187926 A1 | 8/2005 | Britton et al. ................ 707/3 |
| 2001/0042098 A1 | 11/2001 | Gupta et al. ................ 709/206 | | | | |
| 2001/0056461 A1 | 12/2001 | Kampe et al. ............... 709/201 | | FOREIGN PATENT DOCUMENTS | | |
| 2002/0002590 A1 | 1/2002 | King et al. .................. 709/206 | | | | |
| 2002/0003898 A1 | 1/2002 | Wu ............................ 382/187 | | EP | 0481784 A2 | 4/1992 |
| 2002/0004803 A1 | 1/2002 | Serebrennikov ............ 715/513 | | EP | 0598511 A2 | 5/1994 |
| 2002/0007309 A1 | 1/2002 | Reynar ........................ 705/14 | | EP | 0 872 827 A2 | 10/1998 |
| 2002/0023113 A1 | 2/2002 | Hsing et al. ................ 707/513 | | EP | 0810520 B1 | 12/1998 |
| 2002/0023136 A1 | 2/2002 | Silver et al. ............... 709/206 | | EP | 1093058 A1 | 4/2001 |
| 2002/0026450 A1 | 2/2002 | Kuramochi ............ 707/104.1 | | EP | 1280068 A2 | 1/2003 |
| 2002/0029304 A1 | 3/2002 | Reynar et al. ............. 709/332 | | EP | 1361523 A2 | 11/2003 |
| 2002/0035581 A1 | 3/2002 | Reynar et al. ............. 715/513 | | EP | 1376392 A2 | 1/2004 |
| 2002/0065110 A1 | 5/2002 | Enns et al. .................. 455/566 | | JP | 64-88771 | 4/1989 |
| 2002/0065891 A1 | 5/2002 | Malik ......................... 709/206 | | JP | 2002163250 A | 6/2002 |
| 2002/0066073 A1 | 5/2002 | Lienhard et al. ............ 717/105 | | WO | WO 95/07510 A1 | 3/1995 |
| 2002/0078222 A1 | 6/2002 | Compas et al. ............. 709/232 | | WO | WO 99/17240 A1 | 4/1999 |
| 2002/0091803 A1 | 7/2002 | Imamura et al. ............ 709/220 | | WO | WO 00/54174 A1 | 9/2000 |
| 2002/0100036 A1 | 7/2002 | Moshir et al. .............. 717/173 | | WO | WO 00/67117 | 11/2000 |
| 2002/0103829 A1 | 8/2002 | Manning et al. ............ 707/513 | | WO | WO 00/73949 A1 | 12/2000 |
| 2002/0104080 A1 | 8/2002 | Woodard et al. ............ 717/176 | | WO | WO 01/18687 A1 | 3/2001 |
| 2002/0110225 A1 | 8/2002 | Cullis ........................ 379/67.1 | | WO | WO 01/37170 A2 | 5/2001 |
| 2002/0120685 A1 | 8/2002 | Srivastava et al. .......... 709/203 | | WO | WO 01/186390 A2 | 11/2001 |
| 2002/0129107 A1 | 9/2002 | Loughran et al. ........... 709/206 | | WO | WO 02/099627 A1 | 1/2002 |
| 2002/0133523 A1* | 9/2002 | Ambler et al. .............. 707/536 | | WO | WO 02/15518 A2 | 2/2002 |
| 2002/0149601 A1 | 10/2002 | Rajarajan et al. ........... 345/419 | | WO | WO 2004/012099 A2 | 2/2004 |
| 2002/0156792 A1 | 10/2002 | Gombocz et al. ........... 707/100 | | | | |
| 2002/0169802 A1 | 11/2002 | Brewer et al. .............. 715/513 | | OTHER PUBLICATIONS | | |
| 2002/0178008 A1 | 11/2002 | Reynar ........................ 704/272 | | | | |
| 2002/0178182 A1 | 11/2002 | Wang et al. ............. 715/501.1 | | | | |
| 2002/0184247 A1 | 12/2002 | Jokela et al. ................ 707/204 | | | | |
| 2002/0188941 A1 | 12/2002 | Cicciarelli et al. .......... 717/175 | | | | |
| 2002/0196281 A1 | 12/2002 | Audleman et al. .......... 345/762 | | | | |
| 2002/0198909 A1 | 12/2002 | Huynh et al. ................ 707/513 | | | | |
| 2003/0002391 A1 | 1/2003 | Biggs ........................ 368/82 | | | | |
| 2003/0005411 A1 | 1/2003 | Gerken ....................... 717/120 | | | | |
| 2003/0009489 A1 | 1/2003 | Griffin ........................ 707/500 | | | | |
| 2003/0014745 A1 | 1/2003 | Mah et al. ................... 717/170 | | | | |
| 2003/0025728 A1 | 2/2003 | Ebbo et al. ................. 345/744 | | | | |
| 2003/0051236 A1 | 3/2003 | Pace et al. ................... 717/177 | | | | |
| 2003/0056207 A1 | 3/2003 | Fischer et al. ............... 717/174 | | | | |
| 2003/0081791 A1 | 5/2003 | Erickson et al. ............ 380/282 | | | | |
| 2003/0083910 A1 | 5/2003 | Sayal et al. ..................... 705/7 | | | | |
| 2003/0084138 A1 | 5/2003 | Tavis et al. .................. 709/223 | | | | |
| 2003/0097318 A1 | 5/2003 | Yu et al. ....................... 705/35 | | | | |
| 2003/0101204 A1* | 5/2003 | Watson ....................... 708/206 | | | | |
| 2003/0101416 A1 | 5/2003 | McInnes et al. ............. 715/513 | | | | |
| 2003/0106040 A1 | 6/2003 | Rubin et al. ................. 717/106 | | | | |
| 2003/0115039 A1 | 6/2003 | Wang .............................. 704/4 | | | | |
| 2003/0121033 A1 | 6/2003 | Peev et al. ................... 717/175 | | | | |
| 2003/0126136 A1 | 7/2003 | Omoigui ..................... 707/10 | | | | |
| 2003/0140308 A1 | 7/2003 | Murthy et al. ............... 715/500 | | | | |
| 2003/0154144 A1 | 8/2003 | Pokomy et al. ............... 705/28 | | | | |
| 2003/0158841 A1 | 8/2003 | Britton et al. ................... 707/3 | | | | |
| 2003/0158851 A1 | 8/2003 | Britton et al. ............... 707/100 | | | | |
| 2003/0172343 A1 | 9/2003 | Leymaster et al. ......... 715/500 | | | | |
| 2003/0192040 A1 | 10/2003 | Vaughan ..................... 717/173 | | | | |
| 2003/0195937 A1 | 10/2003 | Kircher et al. .............. 709/207 | | | | |
| 2003/0212527 A1 | 11/2003 | Moore et al. ................ 702/179 | | | | |
| 2003/0220795 A1 | 11/2003 | Araysantiparb et al. .... 704/275 | | | | |
| 2003/0229593 A1 | 12/2003 | Raley et al. ................... 705/55 | | | | |
| 2003/0233330 A1 | 12/2003 | Raley et al. ................... 705/55 | | | | |

Charles A. Schulz "Writing Application for Uniform Operation on a Mainframe or PC: A Metric Conversion Program" Published May 1990 California USA, previously provided to Applicants.*

*Technique for Automatically Correcting Words in Text*; Karen Kukich;*ACM Comput. Surv.*, 24, 4 (Dec. 1992); pp. 377-439.

*Putting People First: Specifying Proper Names in Speech Interfaces* Matt Marx and Chris Schmandt; *Proceedings of the ACM Symposium on User Interface Software and Technology*; 1994; pp. 29-37.

*Interfaces and execution models in the fluke kernel*; Bryan Ford, Mike Hibler, Jay Lepreau, Roland McGrath and Patrick Tullman; *Proceedings of the third symposium on operating systems design and implementation*, (1999) p. 101-115.

*Exploring the applications user-expertise assessment for intelligent interfaces*; Michael C. Desmarais and Jiming Liu; *Proceedings of the conference on human factors in computing systems*, (1993) p. 308-313.

*Future directions in user-computer interface software*; James D. Foley; *Conference proceedings on organizational computer systems*, (1991) p. 289-297.

*Human-computer interface development: concepts and systems for its management* H. Rex Hartson and Deborah Hix; *ACM Comput. Surv.* (Mar. 1989) p. 5-92.

*Intergrating computer technology, people technology; strategies and case studies from Georgia Tech's Graphics, Visualization and Usability Center*, Jim Foley; *Proceedings of the workshop on advanced visual interfaces*, (1994) p. 34-43.

*Command management system for next-generation user input*; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/841,266, filed Apr. 24, 2001, entitled "Method and System for Providing Electronic Commerce Actions Based on Semantically Labeled Strings."

U.S. Appl. No. 09/906,552, filed Jul. 16, 2001, entitled "Method and System for Providing Restricted Actions for Recognized Semantic Categories."

U.S. Appl. No. 09/906,467, filed Jul. 16, 2001, entitled "Application Program Interfaces for Semantically Labeling Strings and Providing Actions Based on Semantically Labeled Strings."

U.S. Appl. No. 09/907,418, filed Jul. 17, 2001, entitled "Method and System for Defining Semantic Categories and Actions."

U.S. Appl. No. 09/588,411, filed Jun. 6, 2000, entitled "Method and System for Semantically Labeling Strings and Providing Actions Based on Semantically Labeled Strings."

U.S. Appl. No. 10/141,712, filed May 9, 2002, entitled "Method, System, and Apparatus for Converting Dates Between Calendars and Languages Based Upon Semantically Labeled Strings".

U.S. Appl. No. 10/154,630, filed May 23, 2002, entitled "Method, System, and Apparatus for Converting Numbers Based Upon Semantically Labeled Strings".

U.S. Appl. No. 10/155,680, filed May 23, 2002, entitled "Method, System, and Apparatus for Converting Currency Values Based Upon Semantically Labeled Strings".

U.S. Appl. No. 10/179,810, filed Jun. 25, 2002, entitled "Method, System, and Apparatus for Performing Custom Actions on Digital Content".

U.S. Appl. No. 10/178,680, filed Jun. 24, 2002, entitled "System and Method for Incorporating Smart Tags in Online Content".

U.S. Appl. No. 10/179,438, filed Jun. 25, 2002, entitled "Method and System for Dynamically Providing Actions Associated with Semantically Labeled Strings".

U.S. Appl. No. 10/184,298, filed Jun. 27, 2002, entitled "Method and System for Associating Actions with Semantic Labels in Electronic Documents".

Microsoft Computer Dictionary, Fifth Edition, Microsoft Press, p. 409.

U.S. Appl. No. 10/426,446, filed Apr. 49, 2003, entitled "Methods and System For Recognizing Names In A Computer-Generated Document and For Providing Helpful Actions Associated With Recognized Names".

Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http:www.vorlesungen.uniosnabrueck.de/informatik/shellscript/Html/Man/_Man_NeXT_html/html, http://duplex.hypermart.net/books.bsd/501-504.html, pp. 1-20.

Kuenning, Geoff, "International Ispell," Version 3.1.00, Oct. 8, 1993, http:// www.rt.com/man/findaffix.1.html, http://www.csee.usf.edu/cgi-bin/man-cig?ispell, http://fmg-www-cs.ucla.edu/geoff/ispell.html, pp. 1-33.

Kuenning, Geoff, "Ispell, v.3.1," http://theochem.ki.ku.dk/on_line_docs/ispell/ispell_1.html, pp. 1-6.

"UNIX Man Pages: sed," http://www.calpoly.edu/cgi-bin/man-cgi?spell+1, pp. 1-14.

McMahon, Lee. E., "SED—A Non-Interactive Text Editor," Bell Laboratories, Murray Hill, New Jersey 07974, pp. 1-15.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12.

IBM Corporation, IBM Research Disclosure #368; "Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385.

*User Manual For AddressMate and Address Plus*, CoStar Corporation, AddressMate Software, 1994-1995, pp. 1-210.

*Getting Results With Microsoft® Office 97, Real World Solutions For The Work You Do*, Microsoft Corporation, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

Hewkin, "Smart Tags-the Distributed-Memory Resolution", IEE Review, Jun. 22, 1989, pp. 203-206.

Measuring Units Conversion Table—http://web.archie.org- 1997 Internet French Property, pp. 1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guige: Dreamweaver 2 for Windows and Macintosh, 1999, Peachipit Press, pp. 150-151.

Driza, Scott, "Learn Word 2000 VBA Document Automation", Wordware Publishing Inc., 2001, 6 pp.

Cornell, Paul "Developing Smart Tag DLLs", MSDN Library, http://msdn.microsoft.com/library/default.asp?url=/library/enus/dnsmarttag/html/odc_smarttags.asp, Apr. 2001, pp. 8.

U.S. Appl. No. 10/183,317, filed Jun. 25, 2002, entitled "System and Method for Issuing a Message to a Program", Inventors: Sawicki et al.

U.S. Official Action dated Dec. 8, 2004 cited in U.S. Appl. No. 09/588,411.

U.S. Official Action dated Mar. 17, 2005 cited in U.S. Appl. No. 09/841,265.

U.S. Official Action dated Jul. 25, 2005 cited in U.S. Appl. No. 10/179,438.

U.S. Official Action dated Dec. 15, 2005 cited in U.S. Appl. No. 10/155,680.

U.S. Appl. No. 10/164,960, filed Jun. 6, 2002, entitled "Providing Contextually Sensitive Actions and Help Content in Computer-Generated Documents".

U.S. Appl. No. 10/164,260, filed Jun. 5, 2002, entitled "Mechanism for Downloading Software Components from a Remote Source for Use by a Local Software Application".

U.S. App. No. 10/731,899, filed Dec. 9, 2003, entitled "Mechanism for Downloading Components Associated with XML Documents and Smart Documents".

U.S. Appl. No. 10/366,141, filed Feb. 13, 2003, entitled "Linking Elements of a Document to Corresponding Fields, Queries and/or Procedures in a Database".

U.S. Appl. No. 10/377,258, filed Feb. 28, 2003, entitled "Method and System for Enhancing Paste Functionality of a Computer Software Application".

U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376, filed Feb. 17, 2004, entitled "Methods and Systems for Providing Automatic Actions on Recognized Text Strings in a Computer-Generated Document".

U.S. Appl. No. 10/184,190, filed Jun. 27, 2002, entitled "System and Method for Providing Namespace Related Information".

U.S. Official Action dated Apr. 8, 2005 cited in U.S. Appl. No. 10/164,960.

U.S. Official Action dated Apr. 19, 2005 cited in U.S. Appl. No. 09/841,266.

U.S. Official Action dated Jun. 6, 2005 in U.S. Appl. No. 10/164,260.

U.S. Official Action dated Sep. 2, 2005 cited in U.S. Appl. No. 10/366,141.

U.S. Official Action dated Oct. 20, 2005 cited in U.S. Appl. No. 09/906,552.
U.S. Official Action dated Nov. 2, 2005 cited in U.S. Appl. No. 10/184,190.
U.S. Official Action dated Nov. 10, 2005 cited in U.S. Appl. No. 10/164,260.
U.S. Official Action dated Dec. 14, 2005 cited in U.S. Appl. No. 10/608,267.
U.S. Official Action dated Jan. 11, 2006 in U.S. Appl. No. 09/841,266.
U.S. Official Action dated Feb. 2, 2006 in U.S. Appl. No. 09/906,467.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Devanbue, P. et al., "Chime: customizable hyperlink insertion and maintenance engine for software engineering environments", Software Engineering, Publication date: 1999, ISBN: 1-58113-07400.
"Using Flyswat", http://www.flyswat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about.html, download date: Aug. 7, 1999, 1 pp.
"Intelligent Text Processing: Automatic Cross Referencing", http://www.syntalex.co.uk/services/acrl.html, download date Aug. 7, 1999, 3 pp.
" Intelligent Text Processing: Case Study: Context", http://www.syntalex.co.uk/casestudies/context.html, download date: Aug. 7, 1999, 3 pp.
"Integrating with External Systems: iPlanet™ Unified Development Server", Sun Microsystems, Inc., Ver. 5.0, Jul. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
"Microsoft BizTalk Server 2002—Using BizTalk Mapper", http://msdn.Microsoft.com/library/enus/bts_2002/htm/lat_xmltools_map_intro_zkqb.asp . . . , Microsoft Corporation, 1999-2001, pp. 1-2.
"BizTalk Server 2002 Mapper User Interface", http://msdn.microsoft.com/library/enus/bts_2002/htm/lat_xmltools_map_concept_codw . . . , Microsoft Corporation, 1999-2001, pp. 1.
"BizTalk Server 2002 Compiling Maps", http://msdn.microsoft.com/library/enus/bts_2002/htm/lat_xmltools_map_concept_drgl.a . . . , Microsoft Corporation, 1999-2001, pp. 1.
"BizTalk Server 2002 Testing Maps", http://msdn.microsoft.com/library/enus/bts_2002/htm/lat_xmltools_map_concept_fhhy.a . . . , Microsoft Corporation, 1999-2001, pp. 1-2.
"BizTalk Server 2002 View Links and Functoids By Using Grid Preview", http://msdn.microsoft.com/library/enus/bts_2002/htm/lat_xmltools_map_check_fuwn.as . . . , Microsoft Corporation, 1999-2001, pp. 1.
"The StarOffice™ 6.0 Suite: New Features Guide", Sun Microsystems, V. 1.1, Jl. 2002, pp. 1-31.
"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.
"Q&A: How 'X Docs' Alters the Paradigm for Gathering Business-Critical Information", http:www.microsoft.com/presspass/press/2002/oct02/10-09officefamily.mspx, Microsoft Corporation, Oct. 2002-Feb. 2003, pp. 1-4.
"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.
"Microsoft Unveils Visual Studio.NET Enterprise Tools", Microsoft Corporation, http://microsoft.com/presspass/press/2001/may01/05-21 vseepr.mspx, May 2001, pp. 1-4.
"Microsoft Extends XML Web Services Support in .NET Enterprise Servers Through Visual Studio .NET", http://www.microsoft.com/presspass/press/2002/feb02/02-13-servervspr.mspx, Microsoft Corporation, Feb. 2002, pp. 1-3.
"How to Use XSL to Transform Excel XML Spreadsheet for Server-Side Use", http://support.microsoft.com/default.aspx?scid=kb;en-us;278976, Microsoft Corporation, Aug. 2004, pp. 1-7.
Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.
M. Fernandez et al., "SilkRoute: trading between relations and XML", Computer Networks, vol. 33, No. 1-6, Jun. 2000, pp. 723-745.
V. Braganholo, "Updating Relational Databases Through XML Views", Technical Report, Sep. 2002, pp. 1-61.
G. Falquet et al., "Design and Analysis of Active Hypertext Views on Databases", Information Sciences Institute, Jan. 2002, pp. 1-24.
S. Ceri et al., "Deriving Production Rules for Incremental View Maintenance", Proceedings of the 17th International Conference on Very Large Data Bases, Sep. 1991, pp. 577-589.
A. Bonifati, "Active Behaviors within XML Document Management", EDBT Ph. D. Workshop, Mar. 2000, pp. 1-4.
"Integrated Development Environment (IDE)", http://web.archive.org/web/20020602032242/http:altova.com/products_ide.html, Jun. 2002, pp. 1-2.
Arbortext, "Arbortext and Accessibility", http://web.archive.org/web/20021219133536/www.arbortext.com/html/accessbility.html, Dec. 2002, pp. 1-5.
Arbortext, "XML Compliance, 100% Pure XML", http:web.archive.org/web/20021209185855/www.arbortext.com/html/xml_compliance, Dec. 2002, pp. 1-3.
Arbortext, "Schemas", http://web.archive.org/web/20021221023148/www.arbortext.com/html/schemas.html, Dec. 2002, pp. 1-3.
Arbortext, "Arbortext's Support for XSL-FO", http://web.archive.org/web/20021221021632/www.arbortext.com/html/xslfo.html. Dec. 2002, pp. 1-4.
Corel, "Corel XMetal4, Making XML Content Creation Easy", http://web.archive.org/web/20031118215158/www.corel.com/servlet/Satellite?pagename, Nov. 2003, pp. 1-2.
Corel, "Corel XMetal 4 and Interwoven TeamXML", http://web.archive.org/web/20030807211225/www.corel.com/futuretense_cs/ccurl/corel+xml+4+and +interwoven+teamxml.pdf, Aug. 2003, pp. 1-2.
Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.
Brooks-Bilson, "Programming ColdFusion" [electronic resource] 2001, Safari Tech Books Online, 1st Edition, 25 pp.
Wilker, John, "ColdFusion MX Adds J2EE, XML, and Web Services Compatibility", Aug. 9, 2002, http://builder.com.com/5102/6387-104585.html, 3 pp.
Homer, Alex et al., Professional Active Services Pages, 1997, Wrox Press Ltd., Section"Client-Side Scripting and Components", subsection "Choosing Your Applets, and Controls", 16 pp.
Flanagan, D., "JavaScript—The Definitive Guide, Fourth Edition", Jan. 2002, O'Reilly, 12 pp.
Brockschmidt, K., "Inside OLE, Second Edition", 1995, Microsoft Press, p. 169.
Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990—Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Altova markup your mind!" http://web.archive.org/web/20021204211721/http://altova.com/products_ide.html, Dec. 2002, pp. 1-3.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

U.S. Official Action dated Dec. 29, 2003 in U.S. Appl. No. 09/588,411.

U.S. Official Action dated Feb. 12, 2004 in U.S. Appl. No. 10/154,630.

U.S. Official Action dated Mar. 29, 2004 in U.S. Appl. No. 09/906,552.

U.S. Official Action dated Jun. 14, 2004 in U.S. Appl. No. 09/588,411.

U.S. Official Action dated Jun. 18, 2004 in U.S. Appl. No. 09/818,157.

U.S. Official Action dated Jul. 15, 2004 in U.S. Appl. No. 09/906,467.

U.S. Official Action dated Aug. 20, 2004 in U.S. Appl. No. 09/841,266.

U.S. Official Action dated Sep. 29, 2004 in U.S. Appl. No. 09/907,418.

U.S. Official Action dated Oct. 6, 2004 in U.S. Appl. No. 09/818,157.

U.S. Official Action dated Nov. 2, 2004 in U.S. Appl. No. 10/178,680.

U.S. Official Action dated Jan. 25, 2005 in U.S. Appl. No. 09/906,552.

U.S. Official Action dated Jan. 26, 2005 in U.S. Appl. No. 10/154,630.

U.S. Official Action dated Mar. 1, 2005 in U.S. Appl. No. 09/818,157.

U.S. Official Action dated Mar. 24, 2005 in U.S. Appl. No. 10/141,712.

U.S. Official Action dated May 5, 2005 in U.S. Appl. No. 09/906,467.

U.S. Official Action dated May 6, 2005 in U.S. Appl. No. 09/907,418.

U.S. Official Action dated May 20, 2005 in U.S. Appl. No. 10/184,298.

U.S. Official Action dated Oct. 4, 2005 in U.S. Appl. No. 10/183,317.

U.S. Official Action dated Dec. 5, 2005 in U.S. Appl. No. 09/907,418.

U.S. Official Action dated Feb. 16, 2006 in U.S. Appl. No. 10/184,298.

Harold, E.R., "XML: Extensible Markup Language", IDG Books Worlwide, Books 24x7.com printout, 1998, 20 pp.

Marais, Hannes, "Supporting Cooperative and Personal Surfing With a Desktop Assistant", 1997, ACM Press, pp. 129-138.

U.S. Appl. No. 11/396,937, filed Apr. 3, 2006, entitled "Automatically Adding Proper Names to a Database".

U.S. Official Action dated Feb. 24, 2006 in U.S. Appl. No. 10/154,630.

U.S. Official Action dated Apr. 5, 2006 in U.S. Appl. No. 10/377,258.

U.S. Official Action dated Apr. 10, 2006 in U.S. Appl. No. 10/179,810.

U.S. Official Action dated Apr. 17, 2006 in U.S. Appl. No. 10/179,438.

U.S. Official Action dated Apr. 17, 2006 in U.S. Appl. No. 10/184,190.

U.S. Official Action dated May. 26, 2006 in U.S. Appl. No. 09/588,411, filed Jun. 6, 2000.

U.S. Official Action dated May 31, 2006 in U.S. Appl. No. 10/141,712, filed May 9, 2002.

U.S. Official Action dated Jun. 1, 2006 in U.S. Appl. No. 10/366,141, filed Feb. 13, 2003.

U.S. Final Official Action dated Jul. 19, 2006 in U.S. Appl. No. 09/906,552.

U.S. Official Action dated Aug. 2, 2006 in U.S. Appl. No. 10/731,899.

U.S. Official Action dated Aug. 9, 2006 cited in U.S. Appl. No. 10/164,960.

U.S. Final Official Action dated Aug. 18, 2006 cited in U.S. Appl. No. 09/907,418.

U.S. Official Action dated Sep. 28, 2006 cited in U.S. Appl. No. 10/608,267.

U.S. Final Official Action dated Oct. 5, 2006 cited in U.S. Appl. No. 09/841,266.

U.S. Official Action dated Oct. 10, 2006 cited in U.S. Appl. No. 09/841,265.

European Communication dated Apr. 19, 2006 in EP 05 000 506.5-1527.

U.S. Final Office Action dated Oct. 19, 2006 cited in U.S. Appl. No. 09/906,467.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Nov. 9, 2006 in EP 03010292.5.

"World 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pp.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pp.

U.S. Office Action dated Nov. 9, 2006 in U.S. Appl. No. 10/184,298.

U.S. Office Action dated Nov. 15, 2006 in U.S. Appl. No. 10/179,438.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

European Communication dated Nov. 17, 2006 in EP 03 011 851.7—2211.

European Communication dated Dec. 11, 2006 in EP 03 012 830.0 -2211.

Singapore Search Report/Written Opinion dated Jan. 26, 2007 in SG 200500214-2.

U.S. Official Action dated Feb. 6, 2007 cited in U.S. Appl. No. 09/588,411.

U.S. Official Action dated Feb. 7, 2007 cited in U.S. Appl. No. 10/179,438.

U.S. Official Action dated Feb. 21, 2007 cited in U.S. Appl. No. 10/366,141.

European Communication dated Feb. 16, 2007 cited in European Application No. 04 003 683.2-2211.

Anonymous, "Adding Data from Other Sources in PowerPoint 2002," July 2002, Internet article, XP-002420700, A Professional Approach Series the E-Zine Approach, http://www.glencoe.com/ps/computered/pas/article.php4?articleId-437, 8 pp.

Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx, 9 pp.

Johnson, L., "What's So Special About Paste Special?", Jun. 2002, Internet article, XP-002420702, http://pubs.logicalexpressions.com/Pub0009/LPMArticles.asp?ID=40, 5 pp.

Anonymous, "Moving and Copying Text Tutorial," Aug. 17, 2001, Internet Article, XP-002307566, http://tutorials.findtutorials.com/read/category/102/id/342/p/3, 4 pp.

U.S. Official Action dated Mar. 9, 2007 cited in U.S. Appl. No. 10/426,446.

U.S. Official Action dated Mar. 12, 2007 cited in U.S. Appl. No. 10/141,712.

U.S. Official Action dated Apr. 10, 2007 cited in U.S. Appl. No. 09/907,418.

U.S. Official Action dated May 14, 2007 cited in U.S. Appl. No. 09/906,552.

U.S. Final Official Action dated May 18, 2007 cited in U.S. Appl. No. 10/155,680.

U.S. Official Action dated May 30, 2007 cited in U.S. Appl. No. 09/906,467.

U.S. Final Official Action dated Jun. 15, 2007 cited in U.S. Appl. No. 10/731,899.

Blaheta et al., "Assigning Function Tags to Parsed Text," Morgan Kaufmann Publishers Inc., 2000, pp. 234-240.

C.A.S. Santos, L.F.G. Soares, G.L. de Souza, and J.P. Courtiat, *Design Methodology and Formal Validation of Hypermedia Documents*, Proceedings of the Sixth ACM International Conference on Multimedia, (1998), p. 39-48.

Loren Terveen, Will Hill, and Brian Amento, *Constructing, Organizing, and Visualizing Collections of Topically Related Web Resources*, ACM Transactions on Computer-Human Interaction, vol. 6, No. 1, (Mar. 1999) p. 67-94.

Rob Barrett, Paul P. Magilo, and Daniel C. Kellem, *How to Personalize the Web*, Conference Proceedings on Human Factors in Computing Systems, (1997), p. 75-82.

Matthew Marx and Schmandt, *CLUES: Dynamic Personalized Message Filtering*, Proceedings of the ACM 1996 Conference on Computer Supported Cooperative Work, (1996), p. 113-121.

Karl M. Goschka and Jurgen Falb, *Dynamic Hyperlink Generation for Navigation in Relational Databases*, Proceedings of the Tenth ACM Conference on Hypertext and Hypermedia: Returning to Our Diverse Roots, (1999), P. 23-24.

Alex Pentland, *Preceptual User Interfaces: Perceptual Intelligence*, Commun. ACM, 43, 3 (Mar. 2000), p. 35-44.

Mark A. Stairmand, *Textual Context Analysis for Information Retrieval*, Proceedings of the 20th Annual International ACM SIGIR Conference on Research and Development in Information Retrieval, (1997), p. 140-147.

Robert J. Glushko, Jay M. Tenebaum, and Bart Meltzer, *An XML Framework for Agent-Based E-Commerce*, Commun. ACM 42, 3 (Mar. 1999) p. 106.

U.S. Office Action dated Jun. 3, 2005, in U.S. Appl. No. 10/154,630.

U.S. Official Action dated Sep. 7, 2006 cited in U.S. Appl. No. 10/155,680.

U.S. Official Action dated Jun. 28, 2007 cited in U.S. Appl. No. 09/841,266.

U.S. Final Office Action dated Jul. 12, 2007 cited in U.S. Appl. No. 10/184,298.

U.S. Office Action dated Jul. 13, 2007 cited in U.S. Appl. No. 10/154,630.

U.S Office Action dated Jul. 20, 2007 cited in U.S. Appl. No. 09/841,265.

U.S. Final Office Action dated Jul. 26, 2007 cited in U.S. Appl. No. 10/164,960.

U.S. Office Action dated Aug. 10, 2007 cited in U.S. Appl. No. 10/129,810.

\* cited by examiner

METHOD, SYSTEM, AND APPARATUS FOR CONVERTING NUMBERS BETWEEN MEASUREMENT SYSTEMS BASED UPON SEMANTICALLY LABELED STRINGS

TECHNICAL FIELD

Embodiments of the present invention relate to the field of unit measurement conversion. More particularly, embodiments of the invention relate to the field of converting numbers between measurement systems based upon semantically labeled strings.

BACKGROUND OF THE INVENTION

As a result of the advent and explosion of the Internet and the World Wide Web ("Web"), computer users today frequently receive electronic documents from other users located in countries throughout the world. Electronic documents such as these often include numbers expressed in a unit of measurement utilized in the sender's particular country. For instance, users located in the United States are likely to express numbers in the Imperial system of measurement (e.g. inches, feet, etc.), while European users are likely to express numbers in the Metric system of measurement (e.g. centimeters, kilometers, etc.).

When users receive electronic documents having numbers expressed in measurement systems other than the system used in their native country, users may need to convert the numbers to their local measurement system to understand the meaning of the number. For instance, a user may want to convert a number expressed in degrees Fahrenheit, which is a unit of measure for temperatures commonly used in the United States, to degrees Celsius, which is a unit of measure for temperatures commonly used in Europe. However, converting numbers between measurement systems in this manner has heretofore been difficult for a user to accomplish easily.

Previously, if a user wanted to convert a number contained in an electronic document, such as a word processing document, between measurement systems, the user would first have to copy the number to be converted to a clipboard. The user would then paste the number into an external program or Web site capable of converting the number to the desired destination unit of measure. Once the external program or Web site had completed the conversion, the user may copy the converted number to the clipboard and then paste the converted number back into the electronic document. Although systems such as these do allow a user to convert a number between measurement systems, these systems can be difficult for to use because of the large number of steps required to complete the conversion. Moreover, these previous solutions require the user to perform the conversion using the user interface language of the conversion program or Web site. This can be extremely frustrating for a user that does not understand the language of the conversion program or Web site.

Therefore, in light of the above, there is a need for a method, system, and apparatus for easily converting numbers between measurement systems that do not require a user to utilize an external application or Web site to convert numbers between measurement systems. Moreover, there is a need for a method, system, and apparatus for converting numbers between systems of measure that can present conversion options to the user in a user-selected user interface language.

SUMMARY OF THE INVENTION

Embodiments of the present invention solve the above-described problems by providing a method, system, and apparatus for easily converting numbers between measurement systems and units that do not require the use of an external application or Web site to convert the numbers. Moreover, embodiments of the present invention provide a method, system, and apparatus for converting numbers between units that can present conversion options to the user in a user-selected interface language. Moreover, embodiments of the invention provide an extensible architecture through which a user may add conversion rules that enable conversion of numbers between measurement systems not initially supported.

According to one actual embodiment of the present invention, a method is provided for converting a number between measurement systems in a system for creating and editing an electronic document. According to this embodiment of the invention, software modules are executed in conjunction with a software application for creating and editing an electronic document that allow the convenient conversion of numbers between measurement units. When a user types a string of text, such as a paragraph into the software application, the string is analyzed to determine whether the string of text includes a number having an associated unit name. For instance, a user may type the number "10" and the associated unit name "km", for kilometers. If the string of text includes a number having an associated unit name, the number is semantically labeled with schema information that identifies the unit name as a source unit of measure. For instance, if a string of text includes the number "10" followed by the unit of measure "km", schema information will be associated with the number indicating that the number is expressed with a source unit of measure.

Once a number having an associated unit name has been identified within a string of text, such as a paragraph, the application may display an indication to the user that the number has been semantically labeled. This indication also identifies to the user that actions may be performed on the number. When a selection is received of the number or the indication, a list of actions may be provided to the user identifying conversion options available for the number. For instance, if the identified number includes an associated unit name "m", for meters, an action menu item may be displayed to the user for converting the number to feet or yards. Other types of conversion options may also be presented to the user for converting the number.

According to one embodiment of the invention, a current user interface language setting for the application program is determined prior to providing the list of actions to the user. When the user selects the list of actions, the available actions are displayed to the user in a language specified by the current user interface language setting. In this manner, the user is always presented the conversion options in the current user interface language. Actions may also be included in the list of actions only for conversions supported for the current user interface language setting and may also be specified as being enabled for use with all user interface languages.

After the list of actions has been displayed to the user, a selection of one of the actions may be received. In response to receiving the selection of a conversion action, a converted number may be generated by converting the selected number to the destination unit of measure identified by the selected action. Once the conversion is completed, the converted number and its associated unit name may be inserted into the string of text to replace the selected number and its associated unit name. According to various embodiments of the present invention, a document object model supported by the application program may be utilized to insert the converted number into the string of text. Alternatively, the converted number may be displayed to the user.

According to another embodiment of the present invention, a system is provided for converting a number between measurement systems. According to this embodiment of the invention, the system includes a recognizer plug-in capable of receiving a portion of an electronic document as a string of text from an application program. For instance, the recognizer plug-in may receive a paragraph of text from an application program as it is typed by the user. Once the recognizer plug-in has received the string of text, the recognizer plug-in analyzes the string of text to determine whether the string of text includes a number having an associated unit name. If the string of text includes a number having an associated unit name, the recognizer plug-in semantically labels the number with schema information identifying the unit name as a source unit of measure and identifying the language used to express the string of text. This information is then passed by the recognizer plug-in back to the application program.

According to one embodiment of the invention, the system also includes an application program for creating and editing an electronic document. For instance, the application program may comprise a word processor, a spreadsheet application program, an e-mail application which includes editing functions, or other types of application programs for creating and editing electronic documents. According to this embodiment of the invention, the application program is capable of displaying the string of text along with an indication that the number has been semantically labeled by the recognizer plug-in. This indication may comprise a user interface object for indicating to a user that the number has been semantically labeled and that conversion actions may be performed on the number.

The application program may also be operative to receive a selection of the number or the indication and to provide a list of actions that may be performed on the number to convert the number to another measurement unit. The application may then receive the selection of one of the list of actions and provide the selection and the number to an action plug-in.

The system also includes an action plug-in that is capable of generating a converted number by converting the selected number to the destination unit of measurement identified by action selected from the list of actions. The action plug-in is also operative to replace the selected number and its associated unit name with the converted number and its associated unit name in the string of text. According to one actual embodiment of the invention, the action plug-in may replace the number with the converted number in the string of text by accessing a document object model provided by the application program. Alternatively, the converted number and its associated unit name may be displayed.

According to various embodiments of the present invention, the system provided herein may also include an action plug-in that is operative to register with the application program prior to performing any conversion functions. As a part of the registration procedure, the action plug-in may provide the list of actions that may be performed on the number to convert the number to another measurement system to the application program. Moreover, when creating the list of actions, the action plug-in may determine a current user interface language setting for the application program and generate the action menu items in a language specified by the current user interface language setting. Additionally, the action plug-in may also consult a conversion settings file to generate action menu items for each source unit name enabled for use with all enabled languages and for each source unit name enabled for use with the current user interface language. The contents of the conversion settings file may be modified by a user to enable conversion between measurement systems other than those initially defined in the conversion settings file.

Other embodiments of the present invention provide a computer-controlled apparatus and a computer-readable medium for converting numbers between measurement systems based on semantically labeled strings. These and other details regarding the various embodiments of the invention will become more apparent from the detailed description that follows.

DETAILED DESCRIPTION OF AN ILLUSTRATIVE EMBODIMENT

As described briefly above, embodiments of the present invention provide a method, system, apparatus, and computer-readable medium for converting numbers between units of measure. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1A:
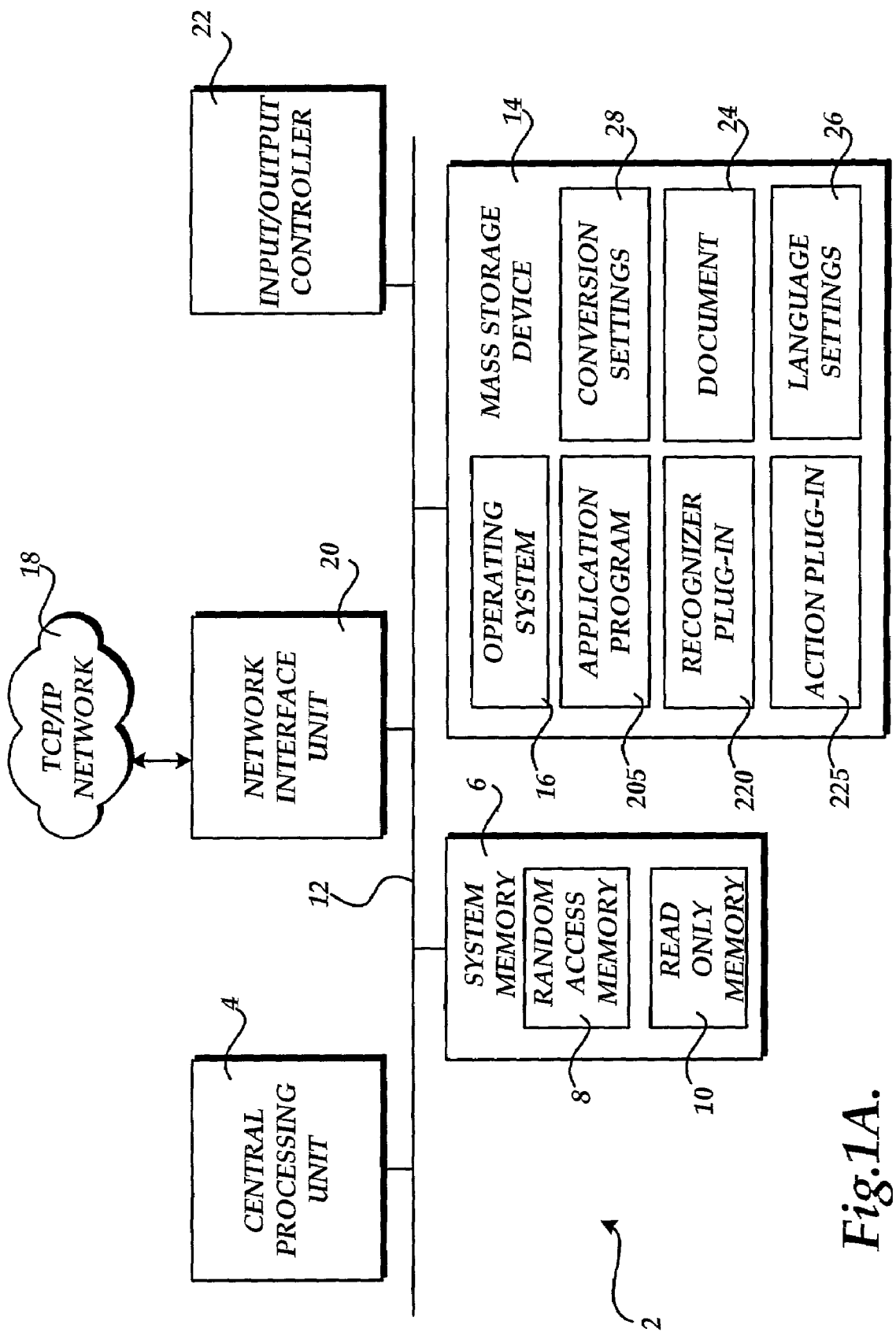
FIG. 1A is a block diagram showing the architecture of a personal computer that provides an illustrative operating environment for embodiments of the present invention.

Referring now to the drawings, in which like numerals represent like elements through the several figures, aspects of the present invention and the illustrative operating environment will be described. FIG. 1A and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules. Additional aspects of an illustrative operating environment and software architecture for implementing the various embodiments of the present invention are described in U.S. patent application Ser. No. 09/588,411, entitled "Method and System for Semantically Labeling Strings and Providing Actions Based on Semantically Labeled Strings", which is expressly incorporated herein by reference.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1A, an illustrative computer architecture for a personal computer 2 for practicing the various embodiments of the invention will be described. The computer architecture shown in FIG. 1A illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program and the electronic document 24 may comprise a word processing document. The application program 205 may also comprise a spreadsheet application program and the electronic document 24 comprise a spreadsheet. Similarly, the application program 205 may comprise an electronic mail application program and the electronic document 24 may comprise an electronic mail message. Application programs for creating and editing other types of electronic documents may also be used with the various embodiments of the present invention.

Embodiments of the present invention provide program modules for use in conjunction with the application program 205 that convert numbers contained within the electronic document 24 between units of measure, also referred to herein as measurement units or measurement systems. In particular, embodiments of the invention provide a recognizer plug-in 220 and an action plug-in 225. As will be described in greater detail below, the recognizer plug-in 220 recognizes numbers having an associated unit name contained within an electronic document 24 and labels the numbers with semantic information identifying the unit name as a source unit of measure. The recognizer plug-in 220 then passes this information to the application program 205 for use by the action plug-in 225. The action plug-in 225 performs actions on the recognized numbers for converting between units of measure. The available conversions are defined in the conversion settings file 28. Additional details regarding the conversion settings file 28 are described below with reference to FIG. 1B.

According to various embodiments of the present invention, the action plug-in 225 may also generate a list of actions that may be performed on a given number. As a part of this process, the action plug-in 225 may query language settings 26 of the application program 205 or operating system 16. The language settings 26 specify the current user interface language. The list of actions may then be created in the current user interface language. Moreover, the action plug-in 225 may also consult the conversion settings file 28 to generate action menu items for each source unit name enabled for use with all enabled languages and for each source unit name enabled for use with the current user interface language. Additional details regarding the operation of the recognizer plug-in 220 and the action plug-in 225, including the use of the conversion settings file 28 and the language settings 26, will be described in greater detail below.

Figure 1B:
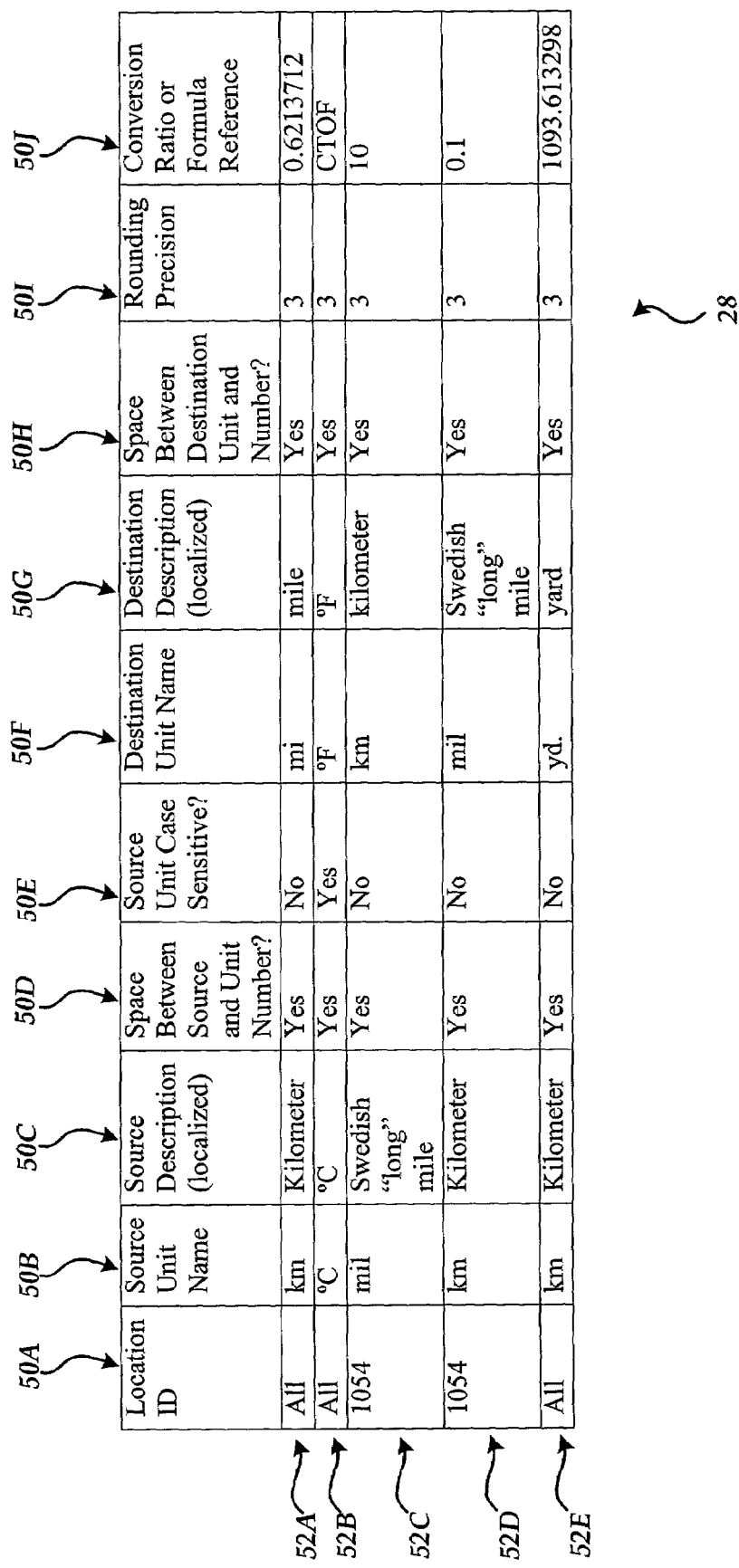
FIG. 1B is a block diagram showing the format and contents of a conversion settings file utilized in various embodiments of the present invention to define available conversions.

Referring now to FIG. 1B, various aspects of the conversion settings file 28 will be described. As discussed briefly above, the conversion settings file 28 is utilized by both the recognizer plug-in 220 and the action plug-in 225. In particular, the recognizer plug-in 220 utilizes portions of the conversion settings file 28 to determine the source unit names that should be recognized within a string of text, and the action plug-in 225 utilizes the conversion settings file 28 to create the action menus that should be presented to the user and to actually perform conversions. Additional details regarding the use of the conversion settings file 28 by the recognizer plug-in 220 and the action plug-in 225 will be described in greater detail below.

As shown in FIG. 1B, the conversion settings file 28 comprises a data file having fields 50A-50J. The field 50A contains a locale identification ("LCID") number for which a particular conversion should be enabled. As known to those skilled in the art, when used in conjunction with the WINDOWS XP operating system from MICROSOFT CORPORATION of Redmond, Wash., the LCID is an identification number used to identify locales and languages. The LCID is used herein to ensure that conversion options will be presented to the user only for conversions that are enabled for use with the currently enabled language. Alternatively, the field 50A may include the phrase "ALL", thereby enabling the conversion for use with all enabled languages. Additional details regarding the use of the field 50A will be described below.

The conversion settings file 28 also includes a field 50B representing the source unit name. The source unit name is the name of the source unit of measure that is associated with a recognized number. The recognizer plug-in 220 uses the field 50B to identify those source unit names that it should recognize. The conversion settings file 28 also includes a field 50C that includes a source description corresponding to the source unit name identified in the field 50B. The contents of the field 50C may be localized for a particular locale. The conversion settings file 28 also includes a field 50D that indicates whether a space is located between the source unit name and number. Some regional formats utilize a space between a number and a unit name while others do not. The field 50D is therefore utilized by the recognizer plug-in 220 to recognize numbers expressed using either format. The conversion settings file 28 also includes a field 50E that defines whether the case of the source unit name should be considered by the recognizer plug-in 220.

The conversion settings file 28 also includes the field 50F which contains data identifying the destination unit name and a field 50G which contains data identifying the destination description. As with the field 50C, the field 50G may be localized for a particular locale. A field 50H is also included that indicates whether a space should be placed between the destination number and its associated unit name in the conversion result. The field 50H is utilized by the action plug-in 225 when formatting conversion results.

The conversion settings file 28 also includes a field 50I indicating the number of decimal places that should be utilized when rounding the converted result. The field 50I may be changed for each conversion. Typically, the rounding precision value contained in field 50I is adjusted for conversions where the destination value is much larger or much smaller than the source number.

The conversion settings file 28 also includes a field 50J which defines the conversion ratio or formula reference that should be utilized for a particular conversion. Where a conversion is performed by multiplying by a coefficient, the field 50J contains the coefficient. Where a conversion is performed utilizing a more complex equation, the field 50J may include a formula reference to the appropriate formula. For instance, the field 50J may include a reference to a formula for converting Celsius values to Fahrenheit values, such as "CTOF". Other types of formula references may also be provided for performing more complex conversions.

The conversion settings file 28 shown in FIG. 1B includes several illustrative conversion entries 52A-52E. The entry 52A corresponds to a conversion from kilometers to miles and is enabled for all languages. The entry 52B corresponds to a conversion from degrees Celsius to degrees Fahrenheit and is also enabled for all languages. The entries 52C-52D convert between Swedish "long" miles and kilometers and are only enabled when the active user interface language corresponds to the LCID "1054." The entry 52E corresponds to a conversion from kilometers to yards and is also enabled for all languages.

It should be appreciated by the reader that the entries 52A-52E are merely illustrative examples of the types of conversions that may be defined in the conversion settings file 28 and that other types of conversions may be similarly defined. In particular, conversions may be defined between miles and kilometers, inches and centimeters, millimeters and inches, feet and centimeters, meters and feet, yards and meters, acres and hectare, U.K. pints and liters, U.S. pints and liters, liters and gallons, ounces and deciliters, quarts and liters, pounds and kilograms, miles per hour and kilometers per hour, and other measurement units. Moreover, it should be appreciated that additional conversions may be defined by adding an appropriate entry to the conversion settings file 28 defining the new conversion.

Figure 2:
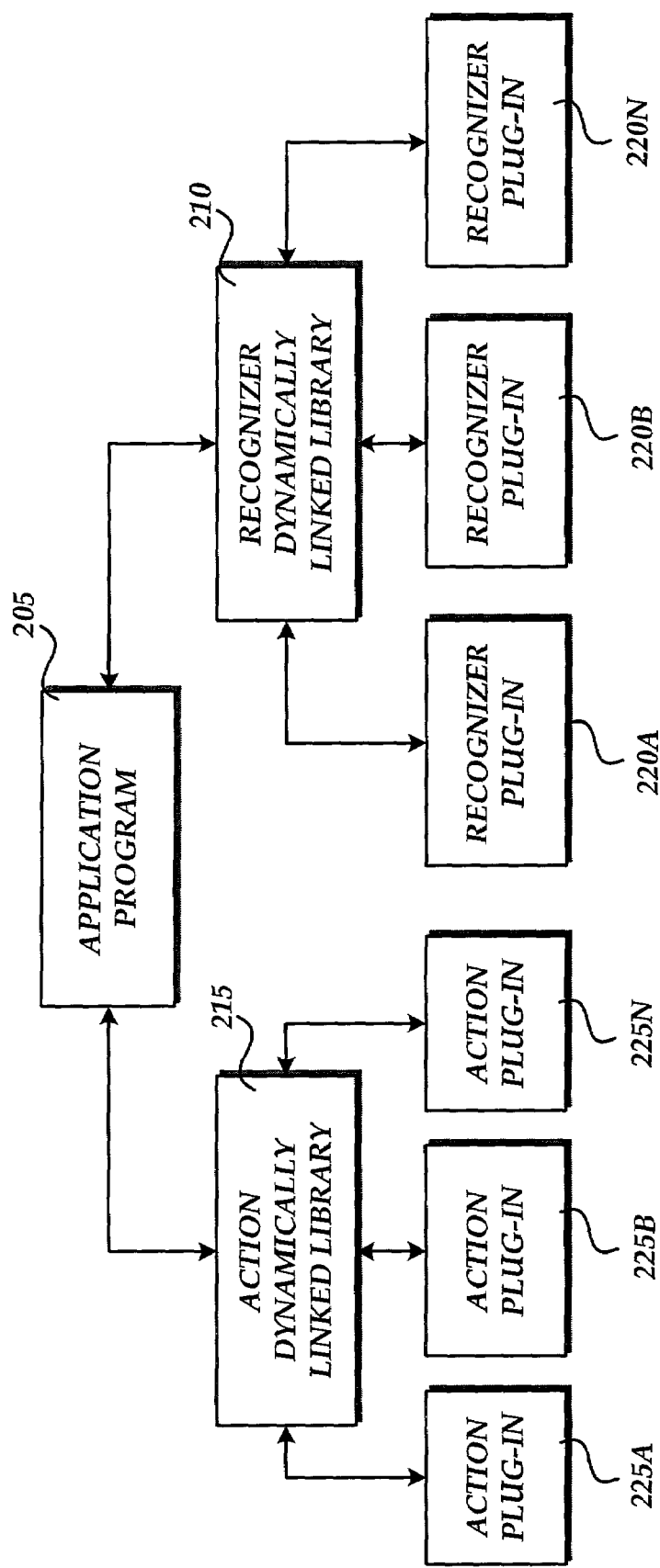
FIG. 2 is a block diagram that shows a software architecture for recognizing, labeling, and performing actions on recognized strings of text according to various embodiments of the present invention.

Referring now to FIG. 2, an illustrative software architecture for use in conjunction with the various embodiments of the present invention will be described. The architecture shown in FIG. 2 includes an application program 205, such as a word processor application program, a spreadsheet application program, or other type of application program for creating and editing electronic documents. The application program 205 may also comprise a Web browser.

The application program 205 is able to communicate with a recognizer dynamically linked library ("DLL") 210 and an action DLL 215. As will be described in greater detail below, the recognizer DLL 210 controls one or more recognizer plug-ins 220A-220N and the action DLL 215 controls one or more action plug-ins 225A-225N.

According to one embodiment of the invention, the recognizer plug-ins 220A-220N and the action plug-ins 225A-225N are automation servers. Automation servers are well-known software components that are assembled into programs or add functionality to existing programs running on the WINDOWS XP operating system from MICROSOFT CORPORATION of Redmond, Wash. Automation servers may be written in a variety of computing languages and can be plugged and unplugged from a program at runtime without having to recompile the program.

The recognizer DLL 210 handles the distribution of text strings from an electronic document being edited by the application program 205 to the individual recognizer plug-ins 220A-220N. The recognizer plug-ins 220A-220N recognize particular strings in an electronic document, such as a word processing document or a spreadsheet document. The recognizer plug-ins 220A-220N may be packaged with the application program module 205 or they may be written by third parties to recognize particular strings of interest. Typically, the recognizer DLL 210 passes strings to the recognizer plug-ins 220A-220N in single paragraphs or cell value increments. However, strings may be passed to the recognizer plug-ins 220A-220N in other sizes and formats.

As part of recognizing certain strings as including semantic information, the recognizer plug-ins 220A-220N determine which strings are to be labeled and how they are to be labeled. After receiving these results from the various recognizer plug-ins 220, the recognizer DLL 210 sends semantic categories to the application program module 205. According to one actual embodiment of the invention, a recognizer plug-in 220 is provided for recognizing strings as containing numbers having an associated unit name. According to this embodiment of the invention, the semantic category comprises schema information that identifies the unit name as a source unit of measure. The schema information may also include information identifying the language in which the string of text is expressed. This information is returned to the recognizer DLL 210 by the recognizer plug-in 220 along with other information that may be utilized by a corresponding action plug-in 225, such as a copy of the number, the source unit name, and the language that the string of text is expressed in. Additionally, the recognizer plug-in 220 may return information identifying the location of the number within the text string, including the length of the text string and the character number of the first letter of the number.

It should be appreciated that each of the recognizer plug-ins 220A-220N are executed separately. The recognizer DLL 210 is responsible for handling the asynchronicity that results from different recognizer plug-ins 220A-220N returning results at different times. In this manner, various types of data may be recognized within a text string and different actions provided for each semantically labeled string. Additional details regarding the operation of the recognizer plug-in 220 for recognizing numbers will be described below with reference to FIGS. 3-8.

After a string is labeled by a recognizer plug-in 220A-220N, schema information is sent to the application program module 205. A user of the application program module 205 may then execute actions that are associated with the schema information on the recognized string. The action DLL 215 manages the action plug-ins 225A-225N that are executed in order to perform the actions. As with the recognizer plug-ins 220A-22N, the action plug-ins 225A-225N may be packaged with the application program module 205 or written by third parties to perform particular actions that are of interest. The action plug-ins 225A-225N provide possible actions to be presented to the user based upon the schema information, or type label, associated with the string. As will be described in greater detail below, the list of actions provided to the user is dynamically generated for each schema type. This information is then provided to the application program 205 which displays the list of actions to the user when the string is selected.

After an action has been chosen from the list of actions, the action DLL 215 manages the appropriate action plug-in 225A-225N and passes the necessary information between the action plug-in and the application program module 205 so that the action plug-in may execute the desired action. Typically, the application program module 205 sends the action DLL 215 an automation request to invoke the action the user has selected. As will be described in greater detail below, according to one embodiment of the invention, an action plug-in 225 is provided that converts recognized numbers to other units of measure. Addition details regarding the operation of the action plug-in 225 and the schema information utilized to identify different source unit names will be described in greater detail below with reference to FIGS. 3-8.

Figure 3B:
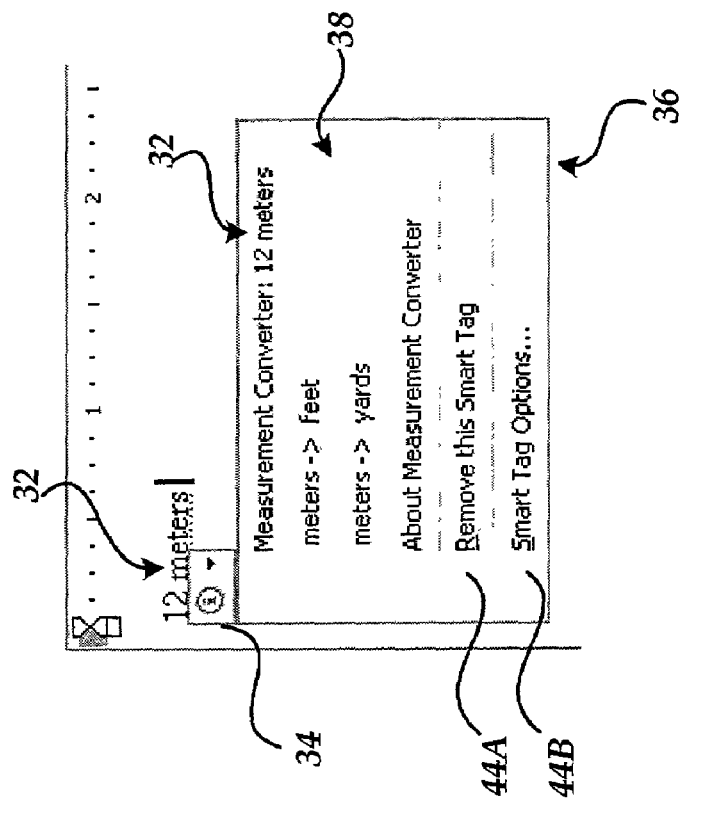
FIGS. 3A-3D are screen diagrams showing screen displays including an action menu for converting numbers between measurement systems provided by various embodiments of the present invention.
Figure 3A:
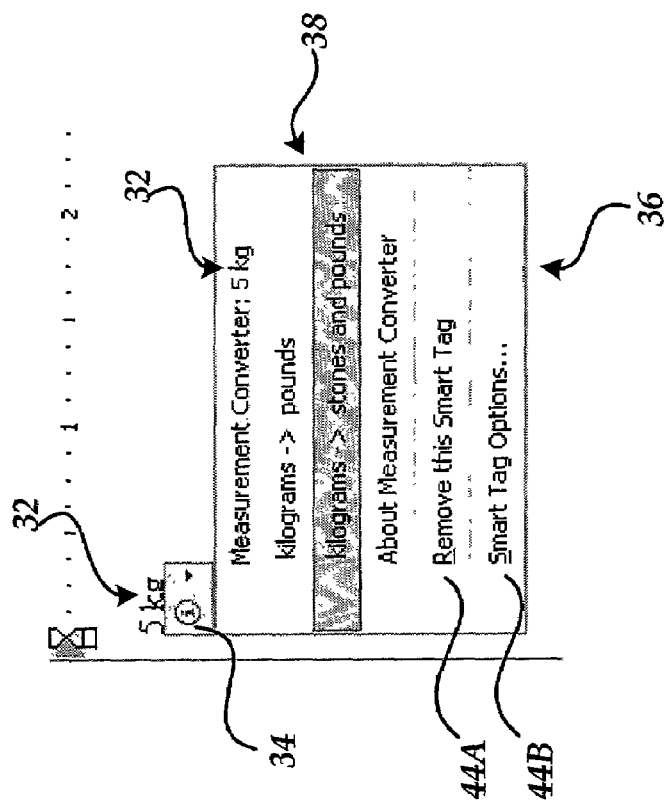

Referring now to FIGS. 3A-3D, an illustrative user interface provided by the various embodiments of the present invention will be described. As shown in FIG. 3A, a number 32 including an associated unit name may be typed by a user into an application program 205, such as a word processor, as a part of a string of text. Once the user has provided the string of text, the string of text is provided to a recognizer plug-in 220 that recognizes numbers contained within the string of text, such as the number 32. The number 32 having an associated unit name identified by the recognizer plug-in 220 is identified to the application program module as a type of semantic information upon which actions may be performed. Therefore, the application program module 205 provides an indication to the user that actions may be performed on the number 32. This indication may be provided to the user by highlighting the number 32 or providing a user interface indication 34 in proximity to the number 32.

When the number 32 or the indication 34 is selected by a user, a list of actions is displayed that may be performed on the number to convert the number to another unit of measure. This list of actions may comprise a dropdown menu 36 having one or more menu items corresponding to the list of actions that may be performed on the number 32. According to one embodiment of the invention, the contents of the dropdown menu 36 may be displayed in one of many different languages. The language in which the dropdown menu 36 is displayed is based on a current interface user language for the application program module 205 or the operating system 16. In this manner, international users throughout the world will be displayed a dropdown menu 36 in their currently installed and active user interface language.

As shown in FIG. 3A, the dropdown menu 36 includes another indication of the number 32 to be converted. The dropdown menu 36 also includes a list of actions 38 that may be performed to convert the number 32 to other measurement systems. According to one embodiment of the invention, the list of actions 38 displayed in the dropdown menu 36 is limited to conversion options specified for use with the currently enabled user interface language on the personal computer 2. In this manner, actions for converting numbers not relevant to the currently enabled language of the personal computer 2 will not be shown in the dropdown menu 36.

As shown in FIG. 3A, the application program module 205 also adds menu items 44A and 44B to the dropdown menu 36. The selection of item 44A removes the semantic labeling from the selected text. Other recognized text in the same (or other) documents will remain labeled, and newly typed text will still be subject to continued recognition and labeling. The selection of item 44B provides a list of user selectable preferences defining the operation and behavior of the recognizer and action plug-ins.

As described briefly above, when a number 32 having an associated unit name is recognized by the recognizer plug-in 220, the number 32 is labeled with schema information identifying the associated unit name as a source unit of measure. Additionally, the language of the string of text may also be identified in the schema information. This schema information is then returned to the application program 205 and is utilized by the action plug-in 225 to determine the appropriate list of actions 38 that should be included in the dropdown menu 36. In this manner, only conversion operations consistent with the source unit of measure and the language used to express the string of text are provided to the user via the dropdown menu 36.

Figure 3D:
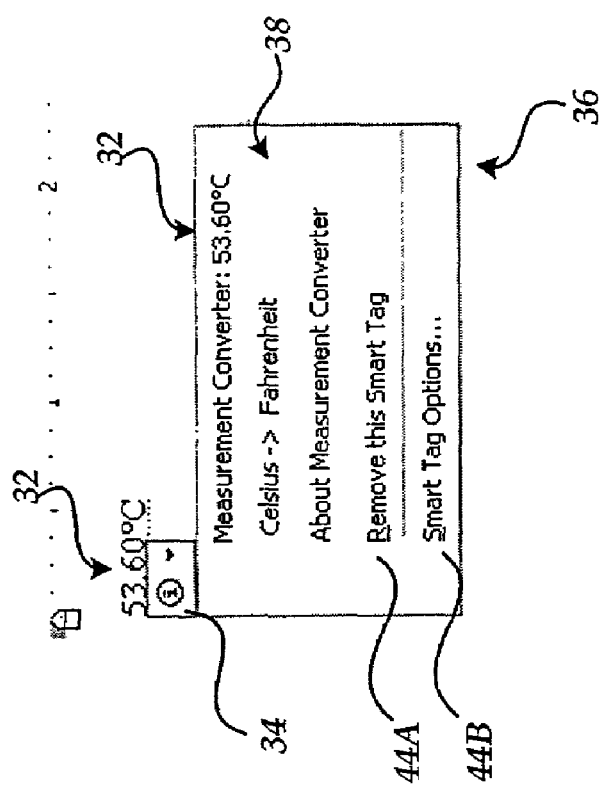

The number 32 shown in FIG. 3A is expressed in kilograms. Therefore, the dropdown menu 36 includes actions in the list of actions 38 for converting the number 32 to pounds, and to stones and pounds. Similarly, the number 32 shown in FIG. 3B is expressed in meters. Therefore, the dropdown menu 36 includes actions in the list of actions 38 for converting the number 32 to feet and to yards. Likewise, the number 32 shown in FIG. 3D is shown degrees Celsius. Therefore, the dropdown menu 36 includes only an action for converting the number 32 from degrees Celsius to degrees Fahrenheit. Also, the list of actions 38 shown in FIGS. 3A, 3B, and 3D is displayed English. It should be appreciated, however, that the dropdown menu 36 would appear in another language if a language other than English was selected as the current user interface language on the personal computer 2.

Figure 3C:
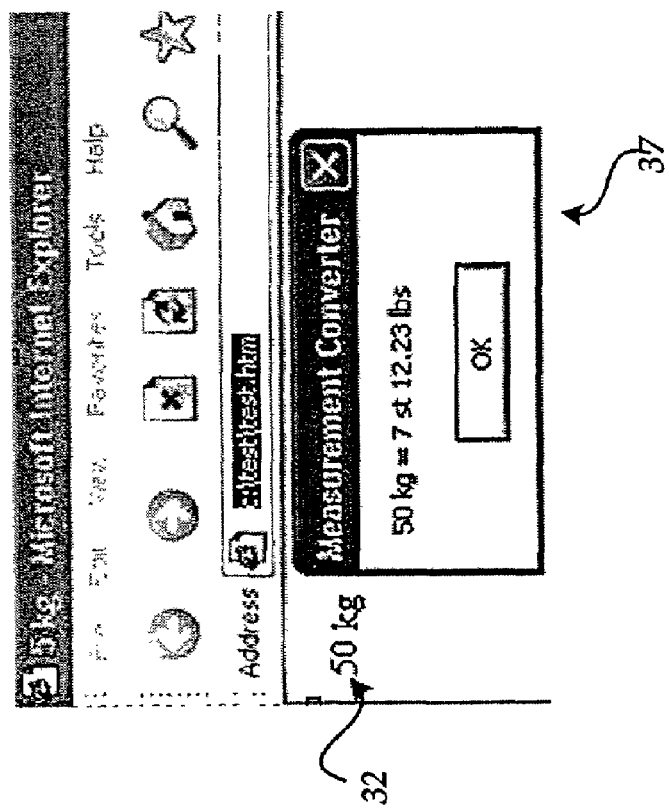

As shown in FIG. 3C, once the user has selected an action from the list of actions 38, the conversion of the number 32 is performed according to the selected action. The converted number may then be displayed to the user in a dialog box 37 as shown in FIG. 3C. Alternatively, the number 32 may be replaced in the string of text with the converted number and the unit name associated with the destination unit of measurement. The number 32 may be replaced in the string of text using a document object model provided by the application program 205. This process is described in greater detail below. Additionally, as will be discussed in greater detail below, the application program 205 receives most of the text shown in the dropdown menu 36 from the action plug-in 225. This process occurs when the application program 205 is initially executed and the action plug-in 225 registers itself with the application program 205. Additional details regarding this registration process will be described below with reference to FIG. 4.

Figure 4:
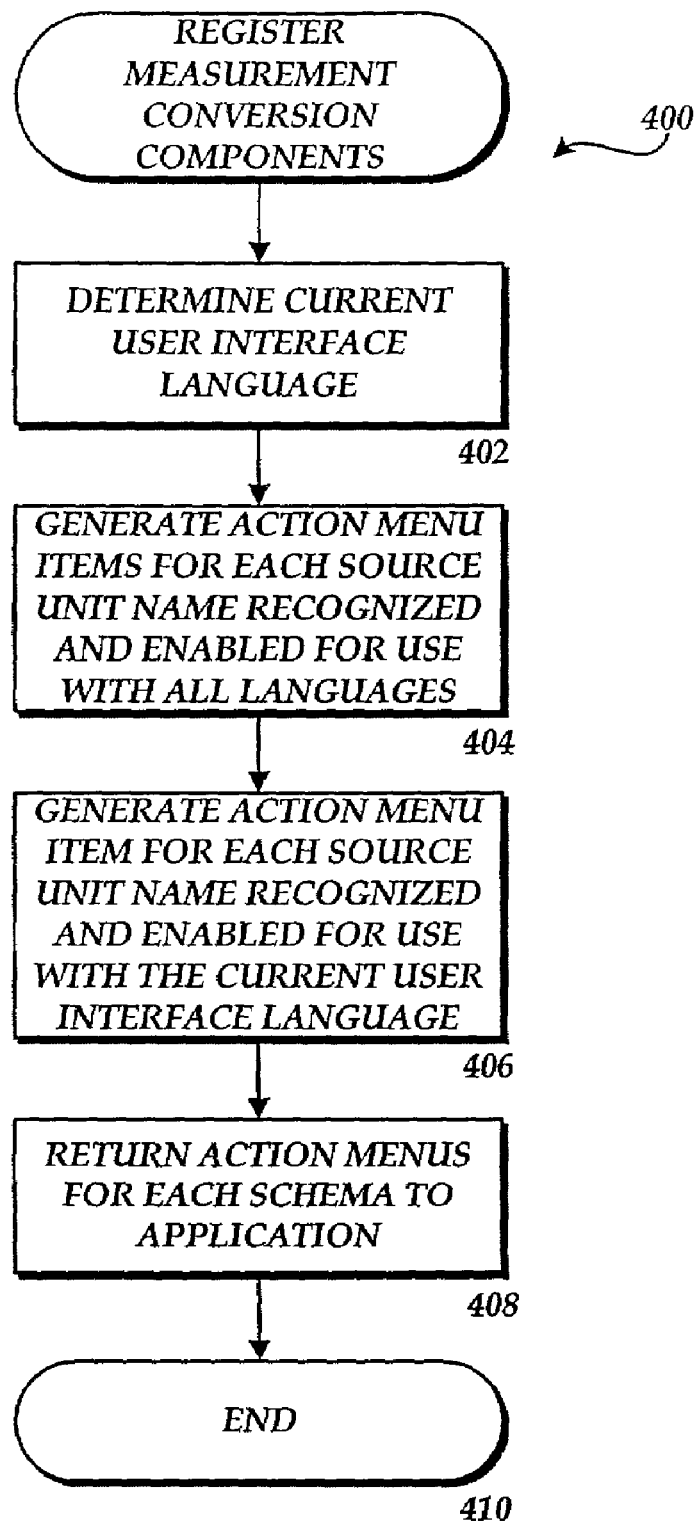
FIG. 4 is a flow diagram showing an illustrative routine for registering an action plug-in with an application program according to one actual embodiment of the present invention.

Referring now to FIG. 4, an illustrative routine 400 will be described for registering the number conversion software components with the application program 205. In particular, when the action plug-in 225 and the recognizer plug-in 220 for converting numbers are first executed, they are registered with the application program 205. By registering with the application program 205, the application program 205 is made aware of the software components and enabled for use with the schema types recognized by the recognizer plug-in 220. Moreover, the action items to be displayed to the user corresponding to each schema type are also enumerated to the application program 205 so that the application program 205 can display the dropdown menu 36 when a number 32 or indicator 34 is selected by a user.

The routine 400 begins at block 402, where the current user interface language is identified. As discussed briefly above, the current user interface language may be stored in the language settings 26 maintained by the operating system 16 or the application program 205. Once the current user interface language has been identified, the routine 400 continues to block 404. At block 404, the action plug-in 225 consults the conversion settings file 28, and generates action menu items for defined conversions that are specified for operation with all languages. In particular, the action plug-in 225 creates action menu items for all defined conversions that include the phrase "ALL" in the field 50A of the conversion settings file 28. The routine 400 then continues to block 406.

At block 406, action menu items are also generated for each defined conversion that has an entry in field 50A corresponding to the current user interface language. In this manner, action menu items are generated only for those conversions enabled for use with all user interface languages and for those conversions enabled for use with the current user interface language. It should be appreciated that the action menu items are generated on a per source unit name basis. In this manner, many separate dropdown menus 36 may be generated, one for each source unit name. Moreover, a separate schema name is utilized for each source unit name and current user interface language. In this manner, regardless of the source unit name or current user interface language, an appropriate dropdown menu 36 will be presented.

From block 406, the routine 400 continues to block 408, where the action menu items for each schema are returned to the application program 205. According to one embodiment of the invention, the application program 205 displays the dropdown menu 36 in response to the selection of a number 32 or an indicator 34. However, it should be appreciated that the action plug-in 225 or other software component may be responsible for the display of the dropdown menu 36. The routine 400 continues from block 408 to block 410, where it ends.

Figure 5:
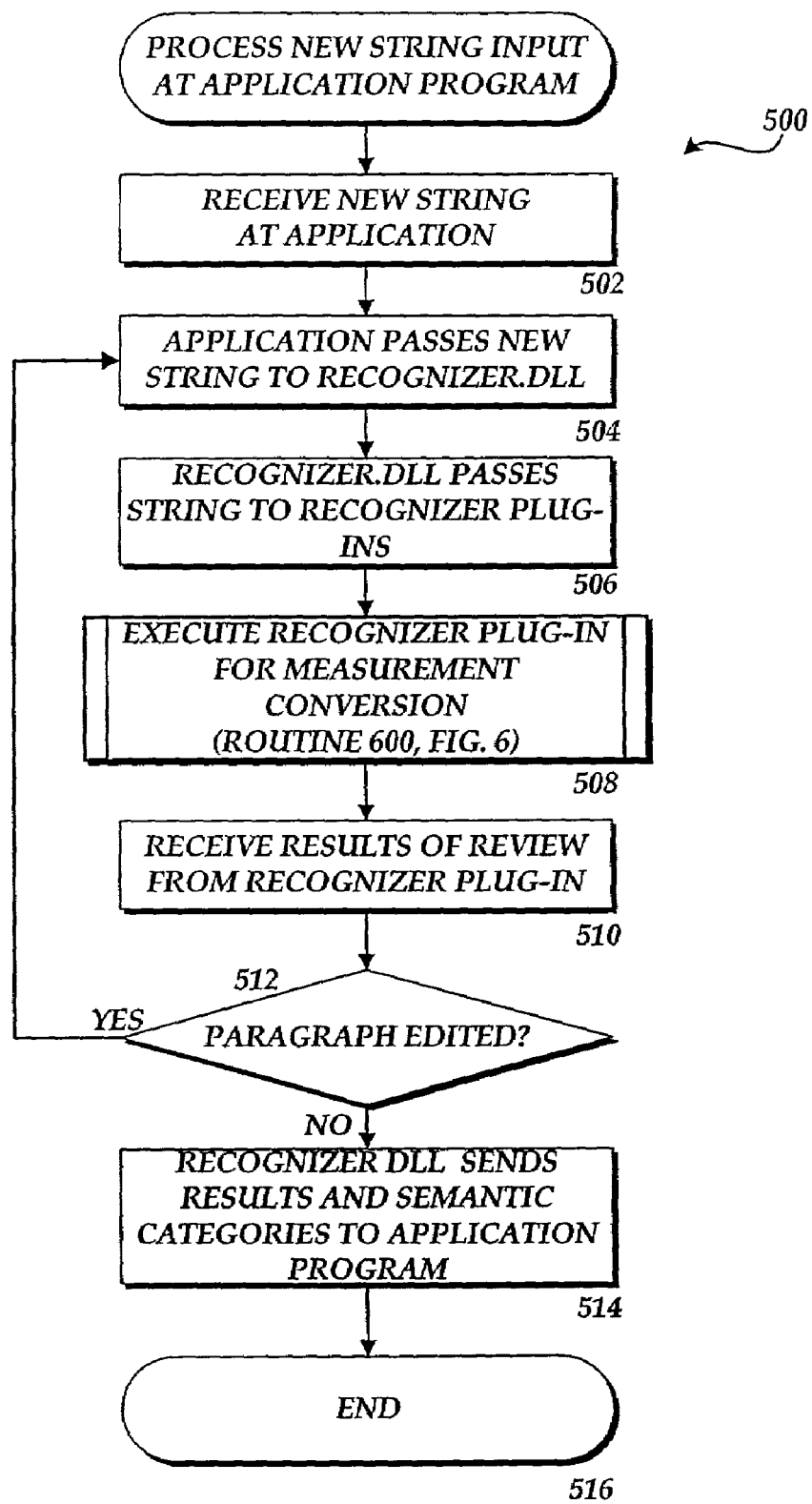
FIG. 5 is a flow diagram showing an illustrative routine for processing a string input provided at an application program according to one actual embodiment of the present invention.

Turning now to FIG. 5, an illustrative routine 500 will be described for processing the input of a new string at the application program 205. The routine 500 begins at block 502, where the application program 205 receives a new string, such as when a user enters a new paragraph into an electronic document or edits a previously entered paragraph. From block 502, the routine 500 continues to block 504 where the application program 205 passes the new string to the recognizer DLL 210. As described above, the recognizer DLL 210 is responsible for communicating with the application program 205, managing the jobs that need to be performed by the recognizer plug-ins 220A-220N, receiving results from the recognizer plug-ins 220A-220N, and sending schema information to the application program module 205 for recognized numbers and source unit names. It should be understood that, in one embodiment of the invention, a paragraph is passed to the recognizer DLL 210 at block 504. However, in alternative embodiments, a sentence, the contents of a spreadsheet cell, a section of the document, the entire document, etc., may be passed to the recognizer DLL 210. In other words, it should be appreciated that the embodiments of the present invention are not limited to simply passing a paragraph to the recognizer DLL 210.

From block 504, the routine 500 continues to block 506, where the recognizer DLL 210 passes the string to the recognizer plug-ins 220A-220N. The routine 500 then continues to block 508 where the recognizer plug-ins are executed on the paragraph to recognize key words or characters within the string. In particular, the recognizer plug-in for converting numbers between measurement systems is executed on the string. An illustrative routine describing the operation of the recognizer plug-in for number conversion is described below with reference to FIG. 6.

At block 510, the results from the recognizer plug-in 220 are received at the recognizer DLL 210. The routine 500 then continues to block 512, where a determination is made by the recognizer DLL 210 as to whether the paragraph has been edited since the string was transmitted to the recognizer plug-ins 220A-220N. If the paragraph has been edited, the routine 500 returns to block 504, where the edited string is passed to the recognizer DLL 210. If the paragraph has not been edited, the routine 500 continues to block 514, where the recognizer DLL 210 sends the results received from the recognizer plug-in 220 to the application program 205. The routine 500 then continues to block 516, where it ends.

Figure 6:
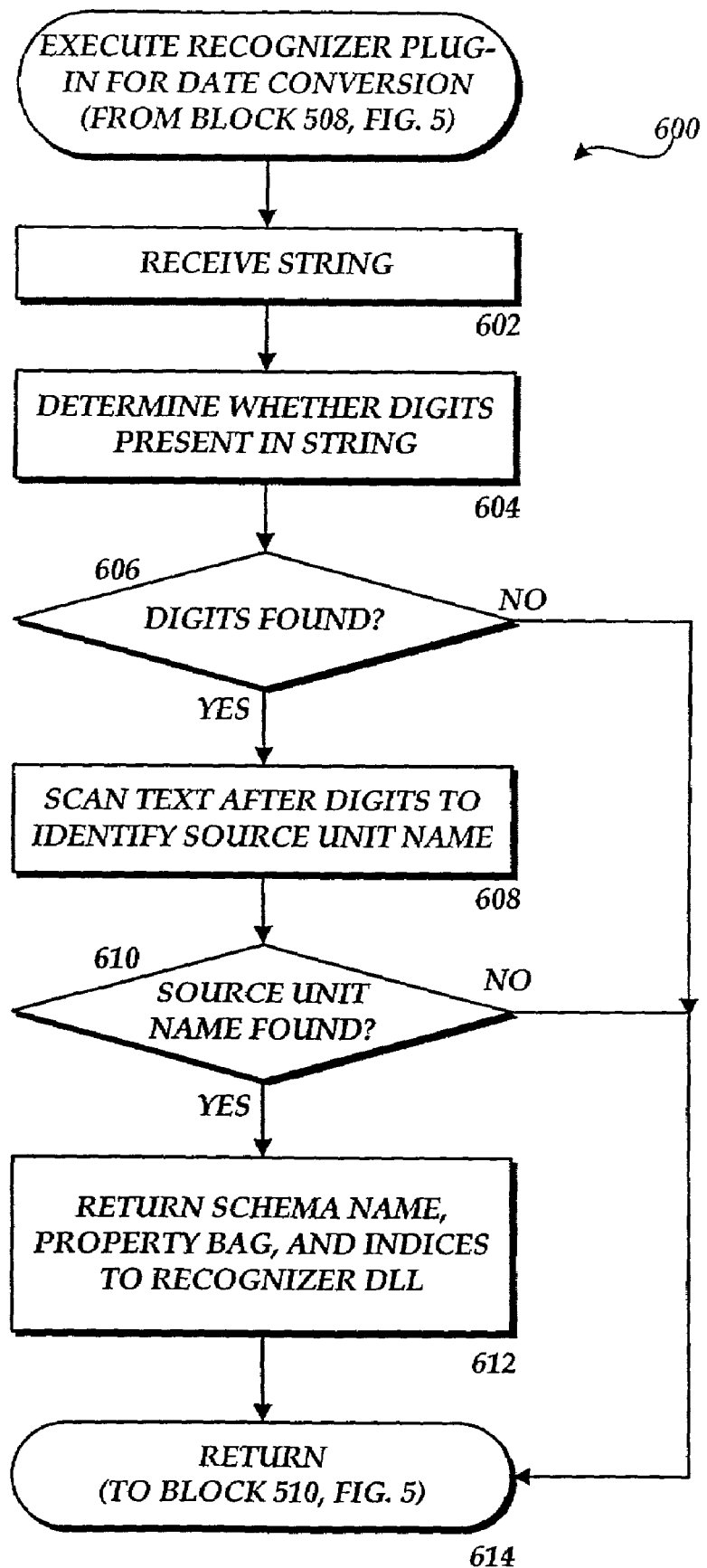
FIG. 6 is a flow diagram illustrating the operation of a recognizer plug-in software module provided according to one actual embodiment of the present invention.

Referring now to FIG. 6, an illustrative routine 600 will be described that illustrates the operation of the recognizer plug-in 220 for converting numbers between units of measure according to one embodiment of the present invention. The routine 600 begins at block 602, where a string of text is received at the recognizer plug-in 220 from the recognizer DLL 210. The routine 600 then continues to block 604, where a determination is made as to whether the string of text contains a number.

From block 604, the routine 600 continues to block 606, where a determination is made as to whether a number was found in the string of text. If no digits were found, the routine 600 branches from block 606 to block 614, where it returns to block 510, shown in FIG. 5. If, however, at block 606, it is determined that digits were found in the string of text, the routine 600 continues to block 608.

At block 608, text located after the identified digits is scanned to determine whether a source unit name is associated with the number. For example, the recognizer plug-in 220 may scan the text after the identified digits for the source unit names "km", "lb", "mi", and other source unit names. The list of the source unit names that the recognizer plug-in 220 searches for is defined by the field 50B of the conversion settings file 28.

From block 608 the routine 600 continues to block 610 where a determination is made as to whether a source unit name associated with the recognized number was located. If no source unit name was found, the routine 610 branches to block 614, where it returns to block 510, shown in FIG. 5. If a source unit name was found that is associated with the recognized number, the routine 600 continues to block 612.

At block 612, schema information is returned to the recognizer DLL 210. In particular, a schema name associated with the source unit name and the currently enabled language is returned to the recognizer DLL 210. Additionally, a "property bag" may also be returned to the recognizer DLL 210. The property bag is an object which stores information about the recognized number that may be utilized by the action plug-in 225. For instance, the property bag may include a format number indicating generally which format the recognized number was written in. Additionally, an index to the recognized number within the string of text may also be returned to the recognizer DLL 210. All of the information returned from the recognizer plug-in 220 to the recognizer DLL 210 may be subsequently passed to the action plug-in 225 and used in the conversion process. This is described in greater detail below with respect to FIGS. 7 and 8. From block 612, the routine 600 continues to block 614, where it returns to block 510, shown in FIG. 5.

Figure 7:
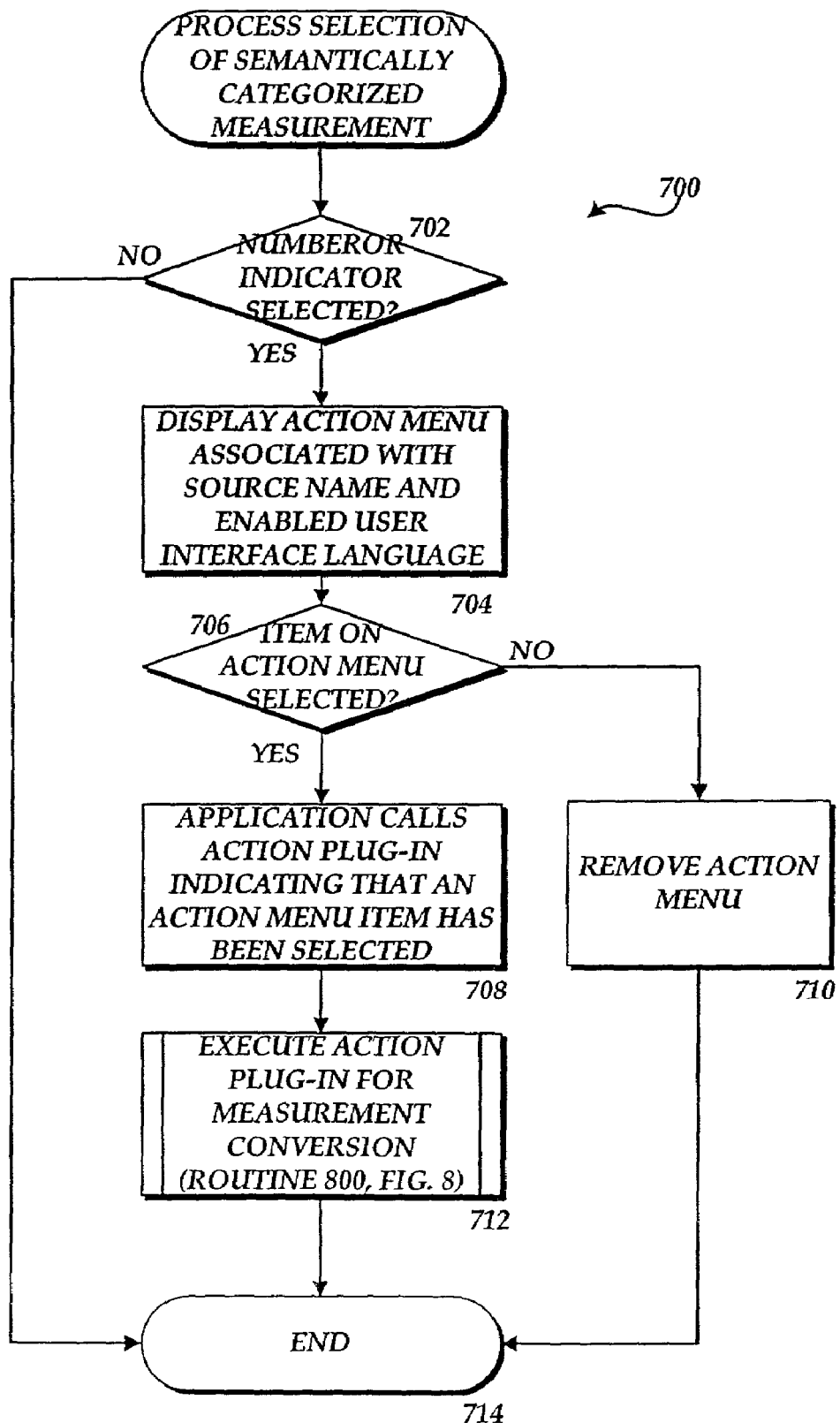
FIG. 7 is a flow diagram illustrating a routine for processing the selection of a semantically categorized number according to one actual embodiment of the present invention.

Referring now to FIG. 7, an illustrative routine 700 will be described for processing the selection of a semantically categorized number having an associated unit name. As discussed above, once a number has been recognized within a string of text by the recognizer plug-in 220A as having an associated unit name, the number may be highlighted or an indication may be provided to the user indicating that the number has been recognized and that actions may be performed on the number. Accordingly, at block 702, a determination is made as to whether the number or indicator has been selected by a user. If the number has not been selected, the routine 700 continues to block 714, where it ends. If, however, the number or indicator has been selected, the routine 700 continues to block 704.

At block 704, the application program 205 displays the list of actions associated with the schema corresponding to the selected number. In this manner, the dropdown menu 36 described above with reference to FIG. 3A is presented to the user. The routine 700 then continues from block 704 to block 706, where a determination is made as to whether the user has selected one of the items from the list of actions. If the user has made the selection of a user interface item other than one of the items from the list of actions, the routine 700 branches to block 710, where the list of actions is removed. If, however, the user does select one of the items from the list of actions, the routine 700 continues to block 708.

At block 708, the application program 205 calls the action plug-in 225 corresponding to the appropriate schema type and indicates that an action item has been selected. The call from the application program 225 to the action plug-in 225 includes the schema name corresponding to the recognized number, the item number of the selected menu item, the name of the calling application program 205, a pointer into an object model provided by the application program 205 for accessing the document 24, the property bag described above with reference to FIG. 6, and the text of the recognized number. The routine 700 then continues to block 712, where the action plug-in for converting numbers between measurement units is executed. An illustrative routine for executing the action plug-in 225 for number conversion is described below with reference to FIG. 8. Once the action plug-in 225 has completed its execution, the routine 700 continues from block 712 to block 714, where it ends.

Figure 8:
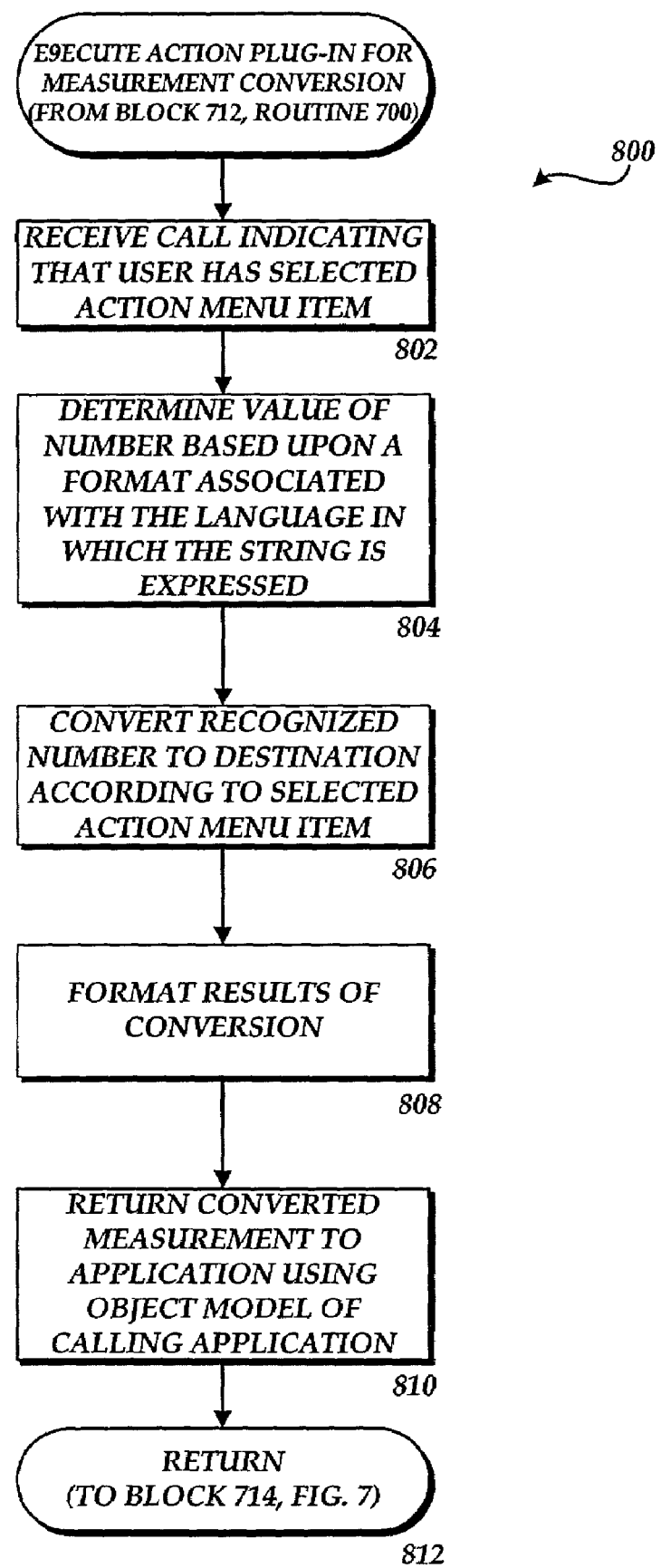
FIG. 8 is a flow diagram showing a routine for executing an action plug-in for converting numbers between measurement units according to one actual embodiment of the present invention.

Referring now to FIG. 8, an illustrative routine 800 will be described for executing an action plug-in 225 for converting numbers between measurement systems. The routine 800 begins at block 802, where the action plug-in 225 receives a call from the action DLL 215 indicating that the user has selected an action menu item. From block 802, the routine 800 continues to block 804, where the action plug-in 225 determines the actual value of the recognized number in view of a format associated with the language in which the string containing the number is expressed. This is necessary because numbers expressed in different languages may include separator characters that have different meanings in different languages. For instance, a number may be expressed in French as "1,729", while in English it would be expressed as "1729." Therefore, at block 804, the action plug-in 225 identifies the regional format for the number from the language settings file 26 based on the language in which the number is expressed. Using the regional format, the actual value of the number can be determined.

From block 804, the routine 800 continues to block 806, where the recognized number is converted to the destination unit of measure according to the selected action menu item. In particular, the value of the field 50J of the conversion settings file 28 for the selected conversion may be utilized to convert the recognized and selected number. The value of the field 50I in the conversion settings file 28 may also be utilized to round the converted number to the appropriate number of digits.

From block 806, the routine 800 continues to block 808, where the converted number is formatted. The converted number may be formatted according to the regional format specified in the language settings file 26. Moreover, the value of field 50H in the conversion settings file 28 may be utilized to format the spacing between the converted number and the destination unit name. Other types of formatting may also be applied to the converted number.

From block 808, the routine 800 continues to block 810 where the number in the string of text is replaced with the converted number. According to one embodiment of the present invention, the replacement is made by accessing a document object model provided by the application program 205. Through the document object model, the action plug-in 225 can directly access the document 24 and make changes therein. Details regarding the use of such a document object model are well known to those skilled in the art. Alternatively, the converted number and its associated unit name may be displayed to the user. From block 810, the routine 800 continues to block 812, where it returns to block 714, described above with reference to FIG. 7.

Based on the foregoing, those skilled in the art should appreciate that various embodiments of the present invention provide a method, system, apparatus, and computer-readable medium for converting numbers between units of measure based upon semantically labeled strings. The above specification, examples and data provide a complete description of the manufacture and use of the composition of the invention. Since many embodiments of the invention can be made without departing from the spirit and scope of the invention, the invention resides in the claims hereinafter appended.

We claim:

1. In a system for creating and editing an electronic document, a method to be executed by a plurality of software programs encoded on a computer-readable medium for converting a number between two systems of measurement, the method comprising:
    receiving a portion of the electronic document as a string of text;
    analyzing the string of text to determine whether the string of text includes a number having an associated unit name;
    in response to determining that the string of text includes a number having an associated unit name, semantically labeling the number with schema information identifying the unit name as a source of measure, wherein the semantic labeling becomes part of the electronic document;
    automatically determining a current user interface language setting for an application program associated with the electronic document;
    displaying the number and the unit name and an indication that the number has been semantically labeled;
    receiving, from a user, a selection of the number or the indication;
    in response to receiving the selection of the number or the indication, displaying, to the user, a list of actions in a language specified by the current user interface language setting that are to be performed on the number to convert the number to a destination unit of measure, the list of actions identified based upon the schema information;
    receiving, from the user, the selection of an action from the list of actions;
    in response to receiving the selection of an action, determining a value for the number based upon a format associated with a language in which the string of text is expressed, if the selected action is associated with converting the number;
    generating a converted number by converting the value to the destination unit of measure identified by the selected action;
    replacing the number with the converted number in the string of text; and
    if the selected action is associated with removing the semantic labeling, removing the semantic labeling from the electronic document.

2. The method of claim 1, wherein operating a converted number by converting the number from the source unit of measure to the destination unit of measure identified by the selected action comprises:
    retrieving from a conversion settings file a conversion ratio or formula corresponding to the selected action; and
    generating a converted number by converting the number from the source unit of measure to the destination unit of measure with the conversion ratio or formula.

3. The method of claim 2, wherein the conversion settings file comprises a conversion ratio or formula corresponding to one or more measurement conversions, and wherein the method further comprises receiving from a user a user-defined conversion ratio or formula and storing the user-defined ratio or formula in the conversion settings file.

4. The method of claim 1, further comprising:
    replacing the number and the associated unit name with the converted number and a unit name associated with the destination unit of measure.

5. The method of claim 4, wherein replacing the number and the associated unit name with the converted number and a unit name associated with the destination unit of measure comprises utilizing a document object model provided by an application for editing the electronic document to replace the number and the associated unit name with the converted number and a unit name associated with the destination unit of measure.

6. The method of claim 5, wherein the list of actions comprises a dropdown menu having one or more menu items corresponding to the list of actions that are to be performed on the number to convert the number to the destination unit of measure.

7. The method of claim 6, further comprising:
    displaying the list of actions in the language specified by the current user interface language setting by generating menu items of the dropdown menu in the language specified by the current user interface language setting.

8. The method of claim 7, further comprising:
    generating at least one menu item enabled for use with at least one language different from the language specified by the current user interface language setting.

9. The method of claim 8, further comprising displaying the number and an indication that the number has been semantically labeled, and wherein the list of actions is provided in response to the selection of the number or the indication.

10. The method of claim 9, wherein the schema information comprises data uniquely corresponding to the source unit of measure and the language specified by the current user interface language setting.

11. The method of claim 10, further comprising:
    determining a value of the number prior to converting the number based upon a format associated with the language in which the string of text is expressed.

12. The method of claim 1, wherein the list of actions comprises a dropdown menu having one or more menu items corresponding to the list of actions that are to be performed on the number to convert the number to the destination unit of measure.

13. The method of claim 12, further comprising:
displaying the list of actions in the language specified by the current user interface language setting by generating menu items of the dropdown menu in the language specified by the current user interface language setting.

14. The method of claim 13, further comprising:
generating at least one menu item enabled for use with at least one language different from the language specified by the current user interface language setting.

15. A system embodied on a computer-readable medium for converting a number between two systems of measurement, the system comprising:
a recognizer plug-in capable of receiving a portion of an electronic document as a string of text from an application program, analyzing the string of text to determine whether the string of text includes a number having an associated unit name, in response to determining that the string of text includes a number having an associated unit name, semantically labeling the number with schema information identifying the unit name as a source unit of measure and identifying the language used to express the string of text, wherein the semantic labeling becomes part of the electronic document, and automatically determining a current user interface language setting for the electronic document;
an application program for creating and editing the electronic document, the application program capable of displaying the string of text and an indication that the number has been semantically labeled, receiving a selection of the number or the indication, in response to receiving the selection of the number or the indication, displaying, to a user, a list of actions in a language specified by the current user interface language setting that are to be performed on the number to convert the number to a destination unit of measure, the list of actions identified based upon the schema information, receiving the selection of an action from the list of actions, and providing the selected action and the number to an action plug-in; and an action plug-in capable of generating a converted number by converting the number to the destination unit of measure identified by the selected action, and replacing the number with the converted number and a unit name corresponding to the destination unit of measure in the string of text, if the selected action is associated with converting the number, and if the selected action is associated with removing the semantic labeling, removing the semantic labeling from the electronic document.

16. The system of claim 15, wherein the list of actions comprises a dropdown menu having one or more menu items corresponding to the list of actions that are to be performed on the number to convert the number to the destination unit of measure, and wherein the action plug-in is further operative to:
generate the menu items of the dropdown menu in the language specified by the current user interface language setting.

17. The system of claim 16, wherein the action plug-in is further operative to identify one or more enabled languages for the application program and to generate at least one menu item enabled for use with at least one language different from the language specified by the current user interface language setting, and to generate at least one menu item enabled for use with the language specified by the current user interface language setting.

* * * * *